(12) United States Patent
Leone

(10) Patent No.: US 8,069,829 B2
(45) Date of Patent: *Dec. 6, 2011

(54) HYBRID VEHICLE SYSTEM HAVING ENGINE WITH VARIABLE VALVE OPERATION

(75) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/431,533

(22) Filed: Apr. 28, 2009

(65) Prior Publication Data

US 2009/0205889 A1 Aug. 20, 2009

Related U.S. Application Data

(63) Continuation of application No. 11/373,618, filed on Mar. 9, 2006, now Pat. No. 7,527,028.

(51) Int. Cl.
*F01L 1/34* (2006.01)

(52) U.S. Cl. .................. 123/90.17; 123/90.15; 123/347; 318/139

(58) Field of Classification Search .............. 123/90.15, 123/90.17, 347, 348; 318/139
See application file for complete search history.

(56) References Cited

U.S. PATENT DOCUMENTS

| | | | |
|---|---|---|---|
| 5,803,029 A | 9/1998 | Yoshihara et al. |
| 5,924,395 A | 7/1999 | Moriya et al. |
| 5,957,096 A | 9/1999 | Clarke et al. |
| 6,085,706 A | 7/2000 | Kadowaki et al. |
| 6,158,413 A | 12/2000 | Kimura et al. |
| 6,233,508 B1 | 5/2001 | Deguchi et al. |
| 6,250,266 B1 | 6/2001 | Okui et al. |
| 6,445,982 B1 | 9/2002 | Swales et al. |
| 6,637,386 B2 | 10/2003 | Murata et al. |
| 6,742,484 B2 | 6/2004 | Sluka et al. |
| 7,527,028 B2 | 5/2009 | Leone |

(Continued)

FOREIGN PATENT DOCUMENTS

CN 1715621 A 1/2006

(Continued)

OTHER PUBLICATIONS

Stein, R.A. et al., "Dual Equal VCT—A Variable Camshaft Timing Strategy for Improved Fuel Economy and Emissions", SAE Technical Paper Series No. 950975, Ford Motor Company.

(Continued)

*Primary Examiner* — Ching Chang
(74) *Attorney, Agent, or Firm* — Allan J. Lippa; Alleman Hall McCoy Russell & Tuttle LLP

(57) ABSTRACT

A method for operating a vehicle, the vehicle including an internal combustion engine coupled in the vehicle, the engine having at least one cylinder with an intake and an exhaust valve, where the opening and closing timing of the intake valve is adjustably retardable and the opening and closing timing of the exhaust valve is adjustably retardable via camshaft adjustments, during engine operation, an energy conversion device coupled in the vehicle capable of selectively supplying and absorbing torque during vehicle operation, and a transmission, the method comprising: adjustably retarding intake valve opening timing and intake valve closing timing from piston top dead center; and adjusting operation of the transmission and the energy conversion device to maintain engine speed sufficient to enable adjustment of said intake and exhaust valve timing.

10 Claims, 11 Drawing Sheets

Figure 1:
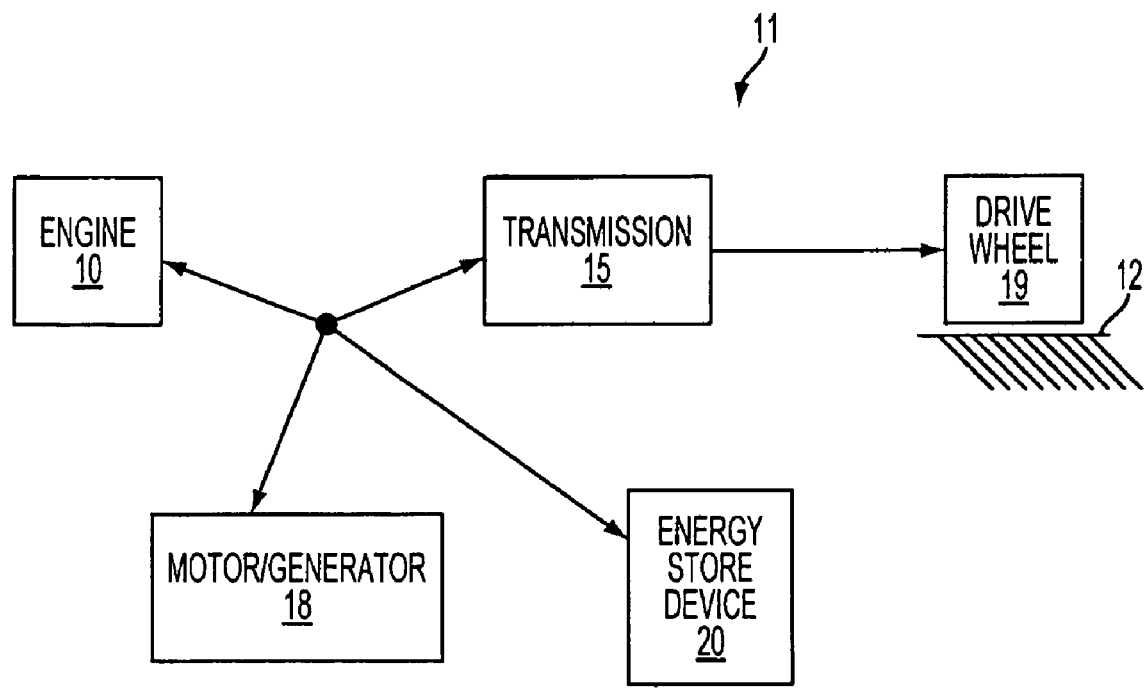

U.S. PATENT DOCUMENTS 7,765,966 B2 * 8/2010 Leone ............... 123/90.17
2007/0209618 A1 9/2007 Leone

FOREIGN PATENT DOCUMENTS

| JP | 2002081330 A | 3/2002 |
|---|---|---|
| WO | 2004061274 A1 | 7/2004 |
| WO | 2005/083249 | 9/2005 |

OTHER PUBLICATIONS

Hirose, K. et al., "Improving Engine Efficiency with High Expansion Ratio Cycle", JSAE Technical Paper Series No. 9739552, Toyota Motor Company.

* cited by examiner

HYBRID VEHICLE SYSTEM HAVING ENGINE WITH VARIABLE VALVE OPERATION

CROSS REFERENCE TO PARENT APPLICATION

This present application is a continuation of U.S. application Ser. No. 11/373,618 filed Mar. 9, 2006, entitled "Hybrid Vehicle System Having Engine with Variable Value Operation", naming Thomas G. Leone, as inventor, the entire contents of which are incorporated herein by reference.

BACKGROUND AND SUMMARY

Engines have used various forms of variable cam timing to improve engine operation over a variety of speed/load conditions. Further, hybrid vehicle systems may use variable cam timing to improve overall vehicle operation.

One approach to such a system is described in Japanese SAE paper 9739552. This system described a hybrid electric vehicle (HEV) using an Atkinson engine with intake variable cam timing enabling late intake valve closing during shutdown and cranking (120 deg after BDC). The late intake valve closing may be used to reduce engine vibration during engine restarts.

However, the inventors herein have recognized a problem with such an approach. Specifically, Atkinson-cycle engines typically suffer a fundamental disadvantage of poor torque at low to medium engine speeds. The reduced peak torque levels may then lead to secondary problems with noise, vibration, and harshness (NVH) and fuel efficiency because higher engine speeds are required to produce sufficient power in real customer driving.

Thus, in one approach, the above issues may be addressed by a system for a vehicle, comprising: an internal combustion engine coupled in the vehicle, the engine having at least one cylinder with an intake and exhaust valve, where the opening and closing timing of the intake valve is adjustably retardable and the opening and closing timing of the exhaust valve is adjustably retardable, during engine operation; and an energy conversion device coupled in the vehicle capable of selectively supplying and absorbing torque during vehicle operation.

In this way, it is possible to obtain improved starting operation, for example by utilizing both intake and exhaust retard. Further, it is also possible to obtain improved torque output during low to mid engine speeds. In other words, late intake/exhaust valve timings may be used to reduce fresh air pumped through the engine during engine shutdown and cranking, thereby reducing oxygen flow to the catalysts in the exhaust. Further, such operation also may reduce NVH during engine starting (cranking) and/or shutdown operation. However, by having variable intake and exhaust valve timing retard, wide-open throttle torque penalties such as in the Atkinson cycle are reduced, and it is actually possible to obtain some torque and power improvement.

Additionally, using both intake and exhaust valve timing retard reduces issues with late intake valve opening in a non-Atkinson cycle engine with variable intake valve timing retard. For example, in such a case, the late intake valve opening may increase noise and vibration, and again the valve timing adjustments may not assist in improving wide-open throttle torque output. Thus, more advanced timings may be used at least during some higher torque output conditions to better take advantage of the hybrid propulsion system and obtain better overall vehicle performance during real world driving conditions.

Furthermore, by using both intake and exhaust valve timing retard it is possible to obtain improved fuel efficiency and feedgas emissions at part throttle operating conditions, for example.

DETAILED DESCRIPTION OF THE FIGURES

Figure 2:
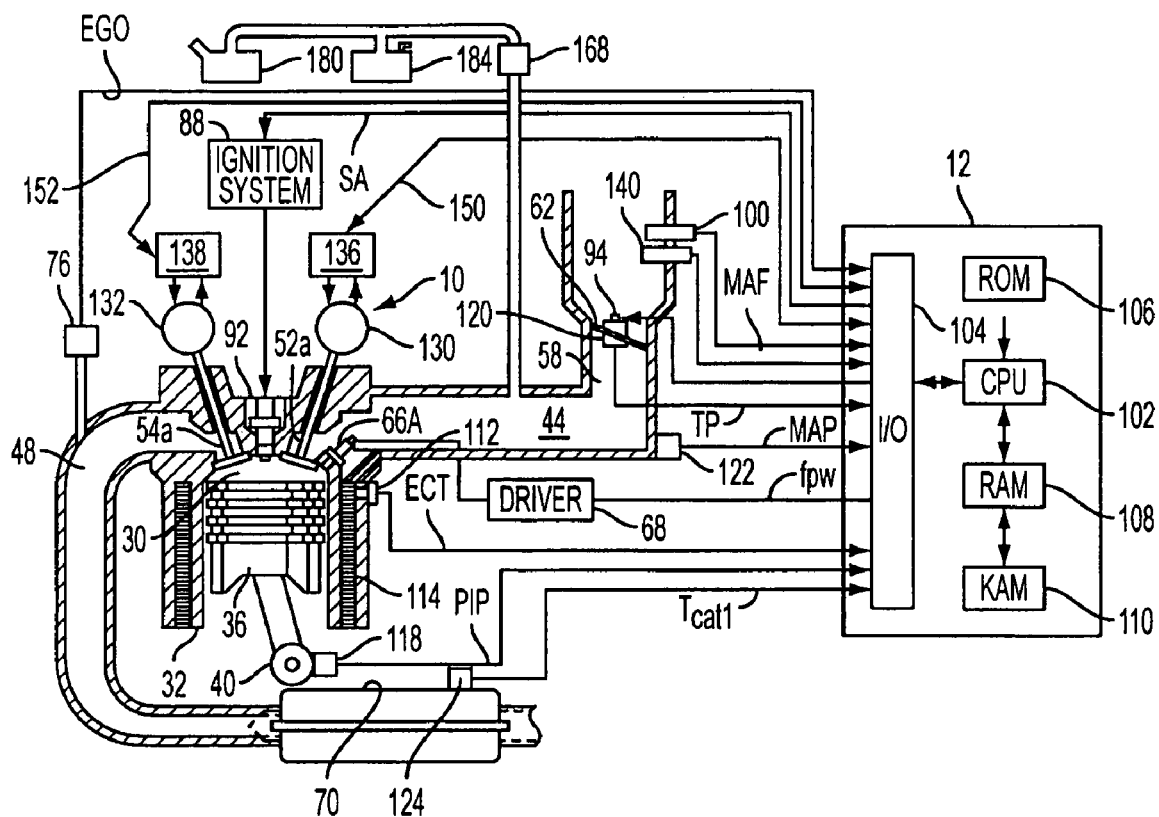
Figure 3:
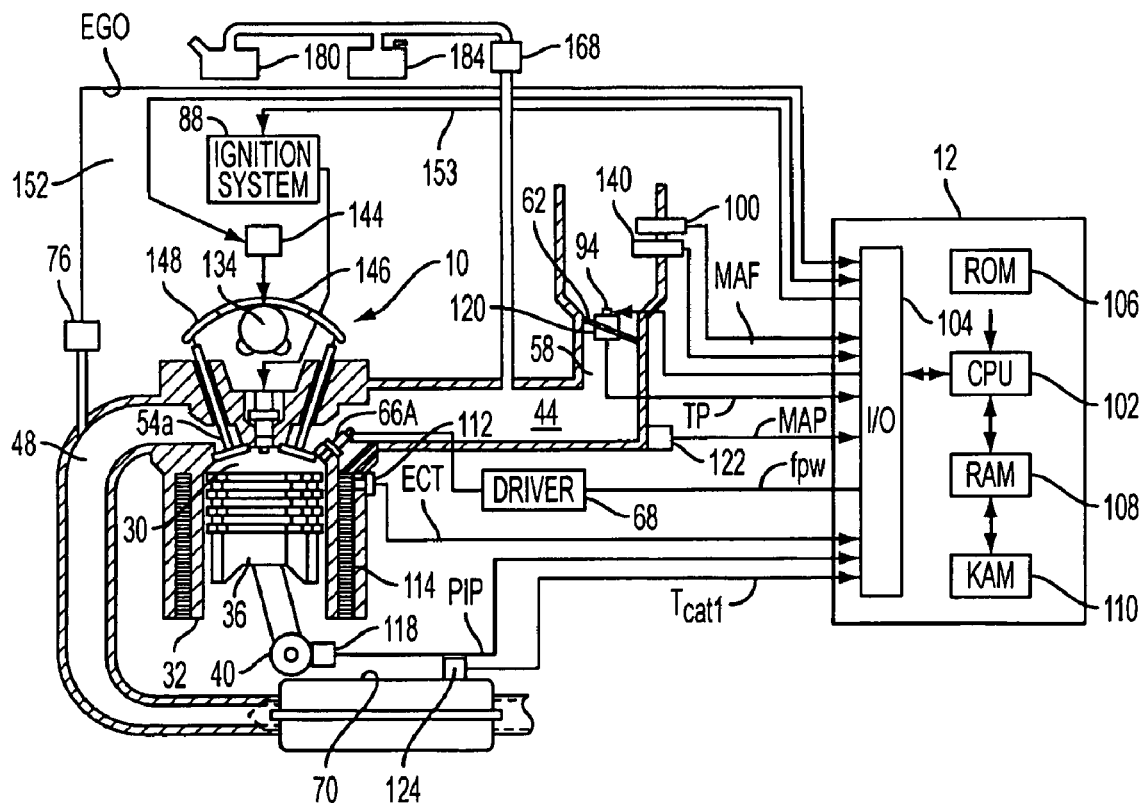
Figure 3A:
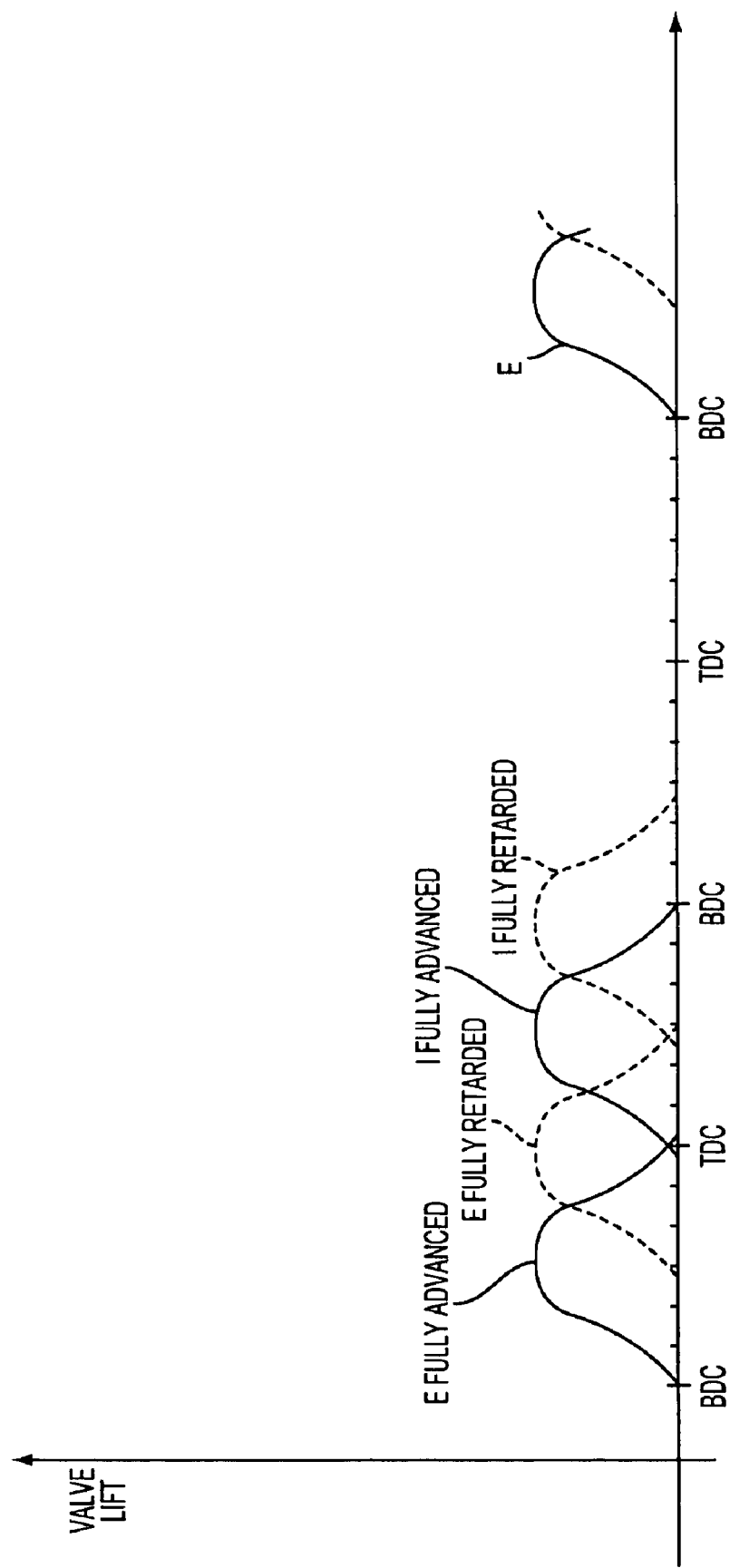
Figure 8:
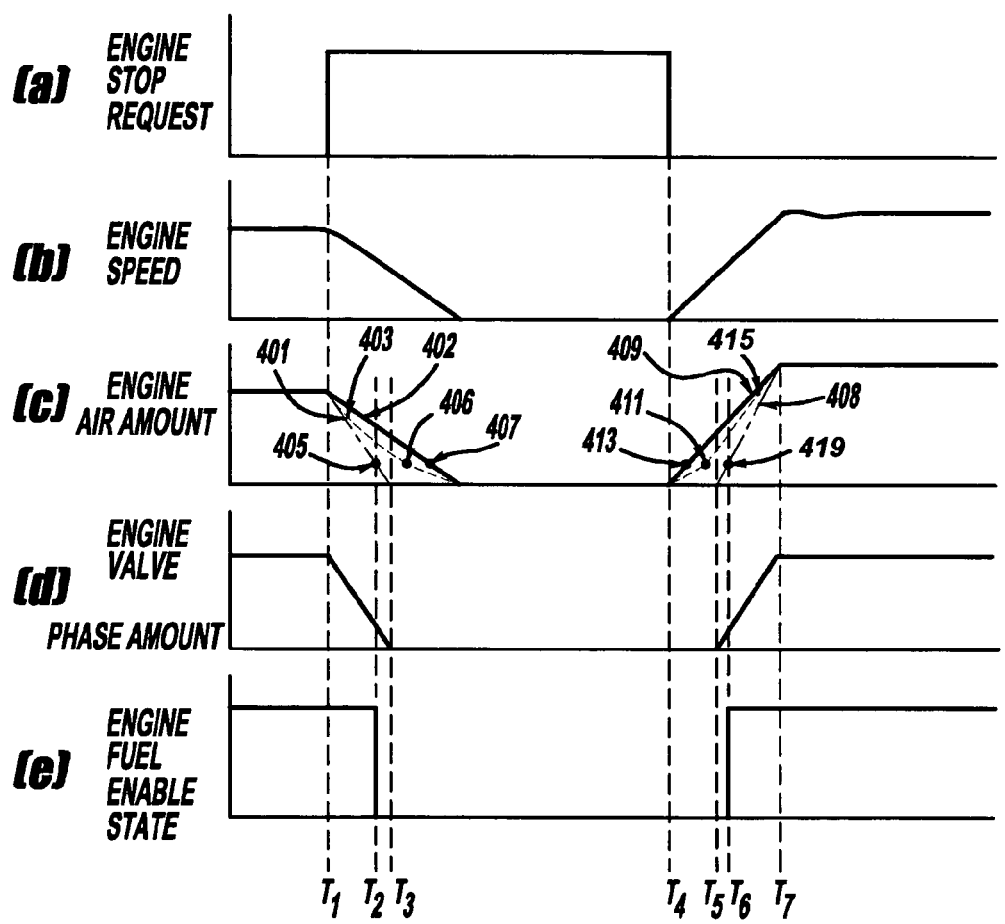
Figure 9:
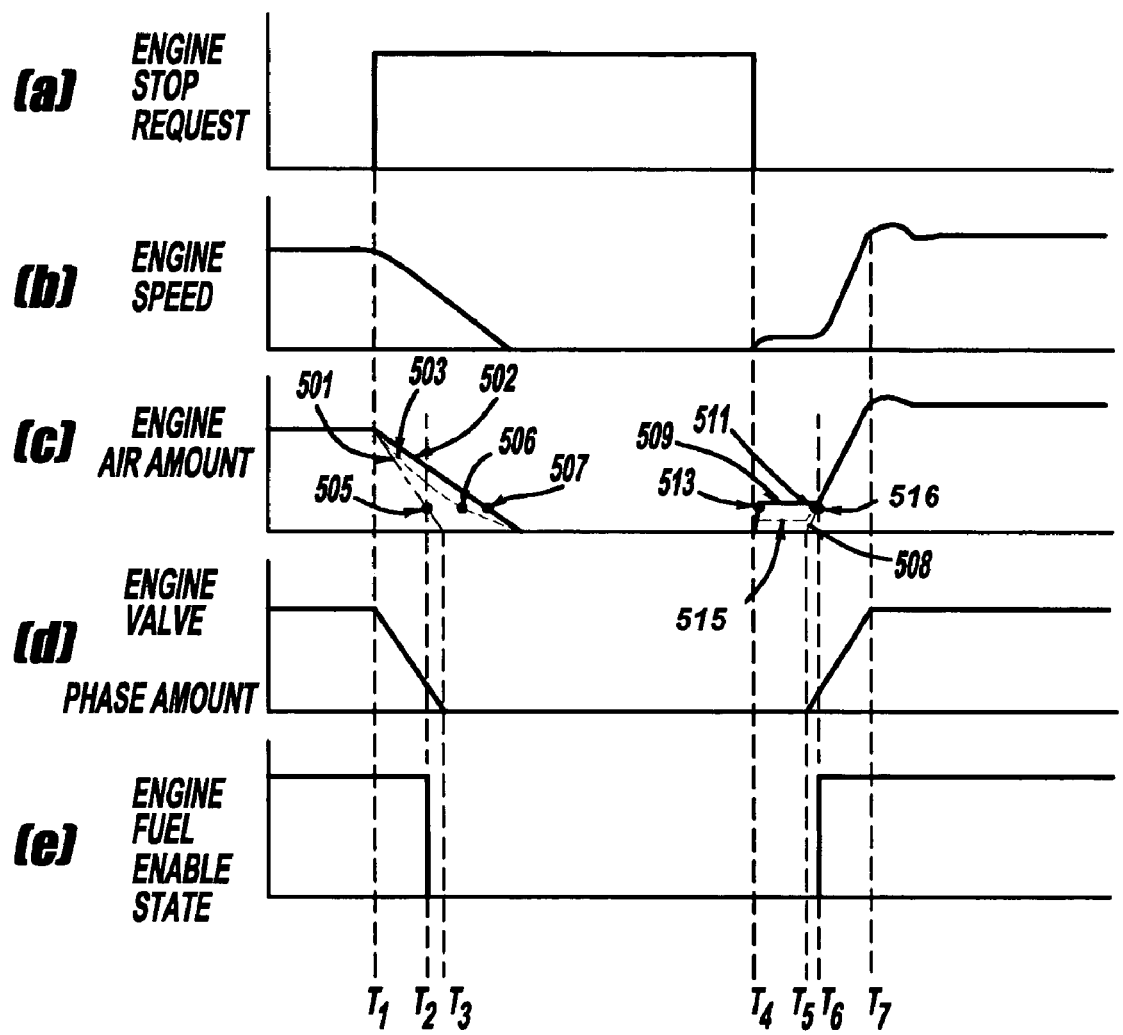
Figure 10:
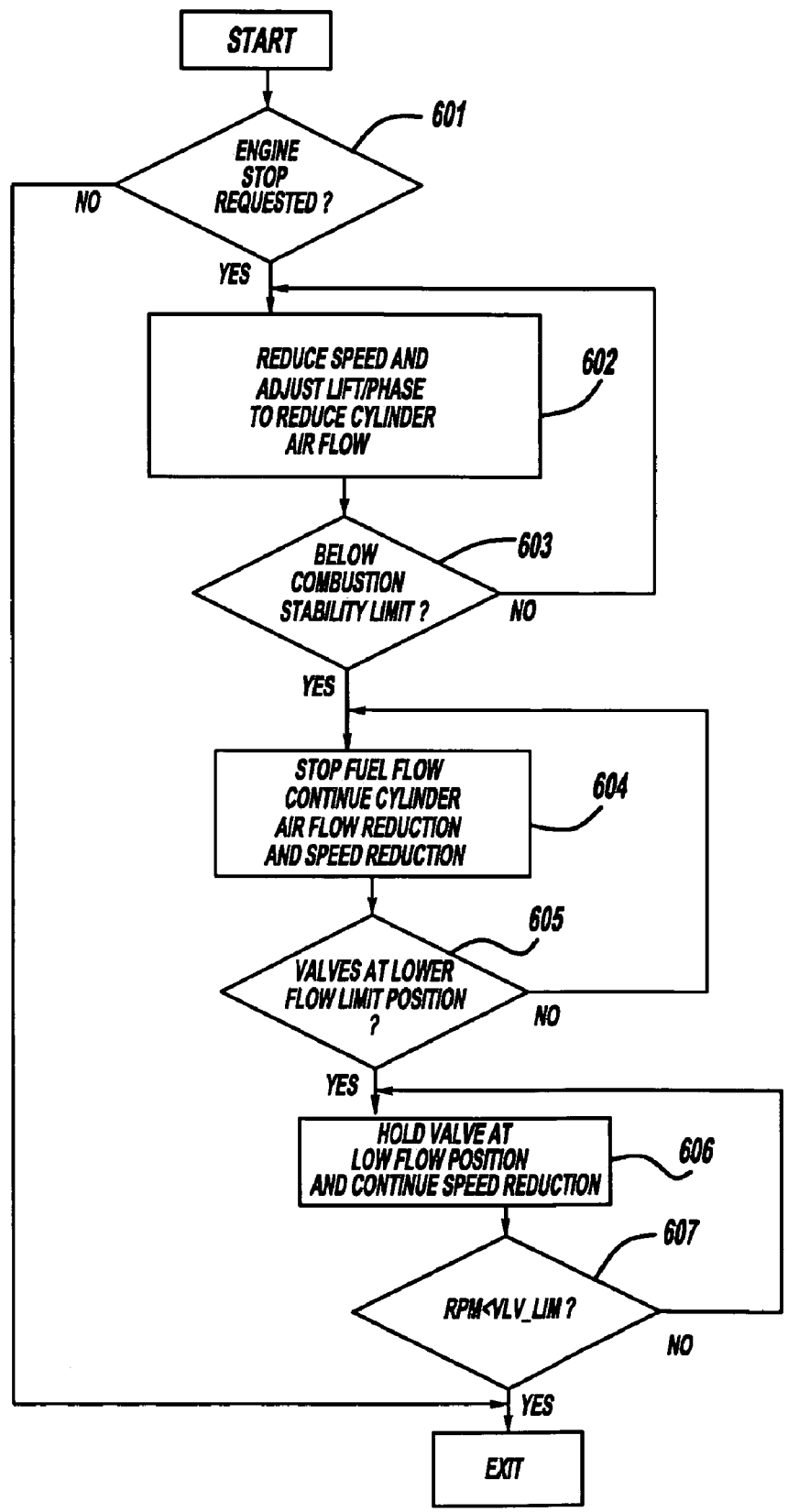
Figure 11:
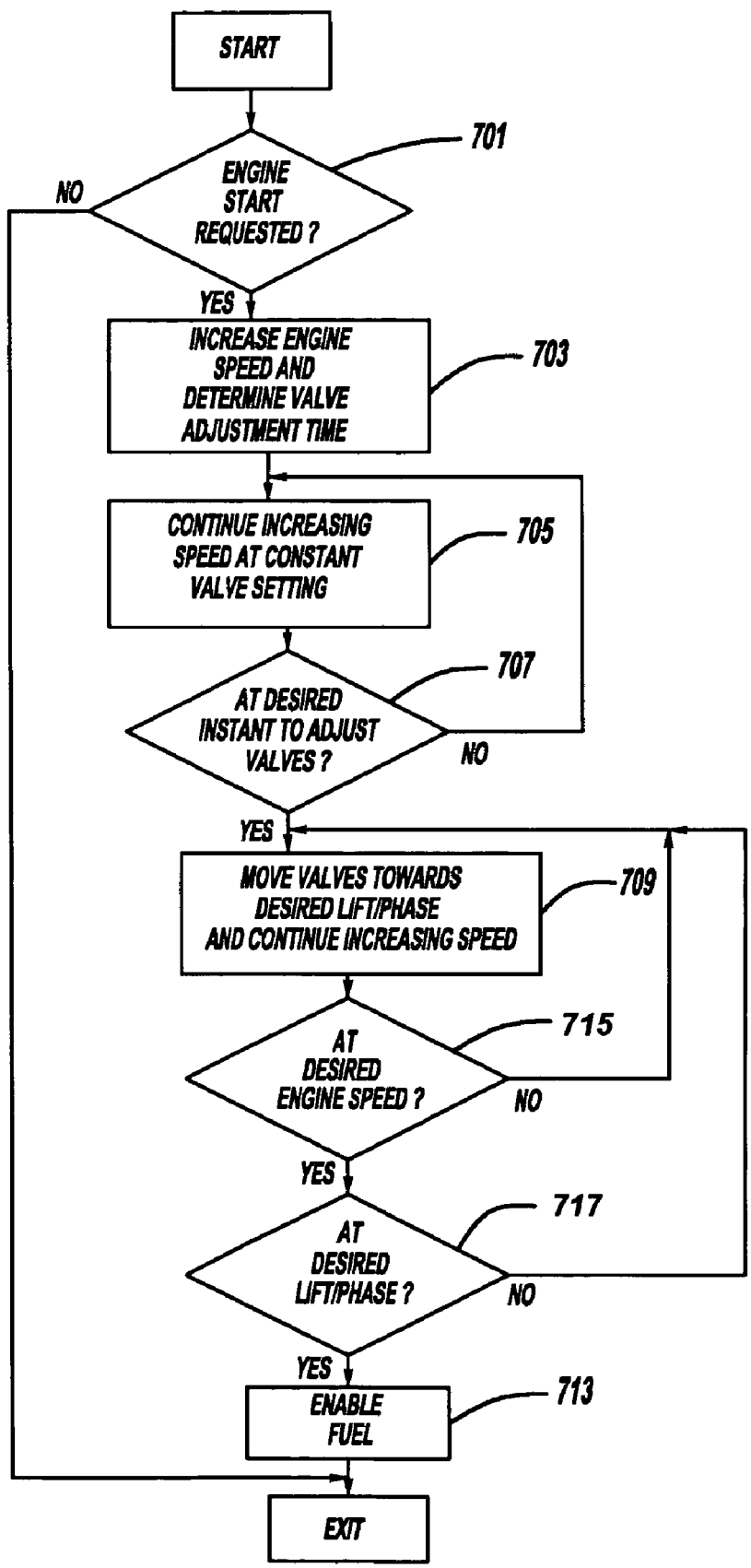

FIG. 1 shows an example hybrid drive system;
FIGS. 2-3 show example engine systems with various variable valve operation;
FIG. 3A shows example intake and exhaust valve timing with dual retard operation;
FIGS. 4-7 are high level flow charts of example operation;
FIG. 8 is an example plot of signals that may be of interest during a simulated engine stop and start sequence;
FIG. 9 is an example plot of signals that may be of interest during an alternate simulated engine stop and start sequence;
FIG. 10 is a flow chart of an example stopping sequence for a variable event valvetrain engine; and
FIG. 11 is a flow chart of an example starting sequence for a variable event valvetrain engine.

DETAILED DESCRIPTION

The present application relates to operation of an engine having adjustable intake and exhaust valve operation in a hybrid propulsion system. While adjustable engine valve timing operation may be used to obtain various advantages in a hybrid propulsion system, there are numerous constraints that have limited different performance aspects of hybrid propulsion systems.

As one example, an Atkinson cycle may be used to provide improved fuel economy and performance when matched with a hybrid propulsion system, however, the Atkinson cycle may result in degraded peak torque output at low to mid speeds, thus potentially reducing vehicle performance under some conditions, such as low battery state of charge. Further, the poor torque response may lead to secondary problems with NVH and efficiency because a higher RPM is required to produce sufficient power in real customer driving. One example of an Atkinson engine cycle is where fairly late intake valve closing (IVC) timing is present (e.g., 92 deg after BDC). In another example, using Atkinson combined with Intake VCT, even later IVC (120 deg after BDC) may be used.

Thus, variable cam timing may be used to enable operation other than an Atkinson cycle, depending on the range of valve timing utilized. Typical hydraulic variable cam timing actuators utilize a default position when insufficient hydraulic pressure is present to enable control, such as during engine starting, which places still further limits on the advance and retard of valve timing. Another possible approach may use intake VCT without an Atkinson cycle. Such a system could achieve late IVC, but this would also entail very late IVO (Intake Valve Opening time). Late IVO means that both valves would be closed for the first part of the intake stroke, so the gases would be expanded to a vacuum until the intake valve opens. When the intake valve finally opened, air would rush into the vacuum, potentially increasing induction noise. Also, the power required to expand gases during the intake stroke and corresponding torque pulsations on the crankshaft may decrease part or all of the NVH benefit of late IVC. Furthermore, an intake VCT mechanism set up for this purpose may not improve wide-open throttle operation that conventional intake VCT is used for (with IVC of 120 deg after BDC, 60 degrees of motion would not enable an early enough IVC for improved low RPM torque).

As another example, in some hybrid systems, the engine is started and stopped at an increased frequency. However, the torque pulses generated by the compression stroke during start-up and/or showdown may result in increased noise and vibration, thus reducing drive feel. Furthermore, the repeated operation may result in increased fresh air, or oxygen, pumped through the exhaust system, potentially saturating emission control devices with oxygen and thus reducing performance during later operation. In other words, during shutdown and during cranking, fuel may be off while the engine spins, so the engine pumps air into catalysts. After the engine starts, it may be run rich temporarily to purge oxygen from the catalyst and enable NOx reduction, however, some NOx emission may still occur, along with potentially increased hydrocarbons and reduced fuel economy.

Still further examples are present, as will be described in more detail herein. However, one approach that may be used to address at least some of these issues is to utilize a dual retard strategy, in which variation of valve timing is used to provide substantial retard of both intake and exhaust events. As will be described in more detail below, use of a dual retard strategy in a hybrid propulsion system also includes consideration of default timing, such as caused by a default hydraulic actuator location, and appropriate selection of the default timing.

With such a system, it is possible to utilize dual retard operation to obtain significant fuel economy and emissions benefits at part load, and some benefits at wide-open throttle, by utilizing varying amounts of retard depending on operating conditions. Further, such operation may be used to improve engine starting, cranking, and shutdown.

For example, the table below summarizes various conditions and indicates how such a system may be used to advantage in which the default timing is selected to be at a retarded timing, such as fully retarded. For example, if the valve timing may be varied in a range between, the default position may be selected to be in a later half of the range.

In one example, substantially late IVC (Intake Valve Closing time) during engine shutdown and during cranking is utilized to reduce the flow of oxygen to the exhaust system, and reduce compression torque pulses. Specifically, the substantially late IVC attained with dual retard may reduce the volumetric efficiency of the engine, which reduces airflow to the exhaust catalyst during engine shutdown and re-start. Further, a lower air charge trapped in the cylinders and reduced effective compression ratio also reduces torque pulsations on the crankshaft during cranking due to compression/expansion work. This may provide reduced vibration during engine re-starts and better vehicle drive feel.

| CONDITION | ACTION/FUNCTION |
| --- | --- |
| Cold start cranking and run-up | During such operation, advanced timing may be desirable, however, sufficient hydraulic pressure may not be available. Therefore, timing is advanced as soon as sufficient hydraulic pressure is present, assuming it is possible to utilize retarded timing for cold starting operating conditions. In other words, engine starts may be used with cam timing in the full retard position, even under cold weather and high altitude conditions. However, immediately after a cold start, engine speed can be fairly high (~1200 RPM) and oil viscosity may also be high, so that VCT operation may be possible immediately after engine start. |
| Cold start idle after initial run-up | During such operation, advanced timing may be desirable. Therefore, engine idle speed is maintained high enough to maintain sufficient oil conditions to enable control of the timing actuator (note that cold oil actually assists such operation by increasing viscosity and thus pressure) |
| Hot start cranking and run-up | During such operation, place/leave actuator in fully retarded locked position to obtain improved hot restart with retarded timing. |
| Hot stabilized idle | During such operation, advanced timing may be desirable. Therefore, engine idle speed is maintained high enough via control of the transmission, and/or hybrid motor/generator. Alternatively, the engine may be deactivated if the desired speed is too low (while continuing to operate the vehicle using the hybrid propulsion system). |
| Shutdown | During such operation, place/leave actuator in fully retarded locked position to obtain improved shutdown operation. |
| Low RPM wide-open throttle | During such operation, advanced timing may be desirable. Therefore, engine idle speed is maintained high enough (e.g., at a minimum RPM) to enable valve timing advancement |

Referring now to FIG. 1, an example hybrid propulsion system 11 for a vehicle is shown including internal combustion engine 10, further described herein with particular reference to FIGS. 2-3, and a transmission 15. In this example embodiment, the hybrid propulsion system 11 also includes a motor/generator 18 and an energy storage device 20. FIG. 1 shows generically that the engine, motor/generator, transmission, and/or energy storage device are interconnected. In one example, the system 11 may be coupled together in a starter/generator configuration in which the motor/generator is coupled between the engine 10 and transmission 15. Alternatively, the system 11 may be coupled in a parallel, series, or combined parallel-series configuration, such as where either the engine and/or the motor can drive the wheel 19, for example.

The transmission 15 may be a manual transmission, automatic transmission, or combinations thereof. Further, various additional components may be included, such as a torque converter, and/or other gears such as a final drive unit, etc. Transmission 15 is shown coupled to drive wheel 19, which in turn is in contact with road surface 12.

The energy storage device 20 may include a battery, a capacitor, a flywheel, a hydraulic or pneumatic pressure vessel, among others and combinations thereof. The motor/generator can be operated to absorb energy from vehicle motion and/or the engine and convert the absorbed energy to an energy form suitable for storage by the energy storage device. The motor/generator can also be operated to supply an output (power, work, torque, speed, etc.) to the drive wheels 19 and/or engine 10 using stored energy.

In some embodiments, the motor may be configured to also serve as a generator, thereby eliminating one or more separate generator devices. Alternatively, in some embodiments, a separate motor and generator can be used where the motor is configured to provide a motor output from the energy supplied by the battery, and the generator is configured to absorb output (e.g. power, torque, work, speed, etc.) from the engine and/or transmission, and convert the absorbed output to energy storable by the energy storage device. The term motor will be used herein to describe a device that can provide the role of both a generator and a motor.

Various types of energy/torque transmission may be used, such as a mechanical coupling between the motor 18 and engine 10 or transmission 15. Further, any connections between the motor and the energy storage device may indicate transmission of a variety of energy forms such as electrical, mechanical, hydraulic, pneumatic, etc. For example, torque may be transmitted from engine 10 to drive the vehicle drive wheels 19 via transmission 15. As described above motor 18 may be configured to operate in a generator mode and/or a motor mode. In a generator mode, system 18 absorbs some or all of the output from engine 10 and/or transmission 15, which reduces the amount of drive output delivered to the drive wheel 19, or the amount of braking torque to the drive wheel 19. Such operation may be employed, for example, to achieve efficiency gains through regenerative braking, improved engine efficiency, etc. Further, the output received by system 11 may be used to charge energy storage device 20. In motor mode, the system 11 may supply mechanical output to engine 10 and/or transmission 15, for example by using electrical energy stored in an electric battery.

As noted herein, hybrid propulsion embodiments may include full hybrid systems, in which the vehicle can run on just the engine, just the motor, or a combination of both. Assist or mild hybrid configurations may also be employed, in which the engine is the primary torque source, with the hybrid propulsion system acting to start the engine and to selectively deliver added torque, for example during tip-in or other conditions. Further still, starter/generator and/or smart alternator systems may also be used. In any case, the hybrid propulsion system is able to utilize the motor to supply and/or absorb torque during vehicle operation, such as conditions other than just engine starting as compared to a conventional starter motor.

FIG. 2 shows one cylinder of a multi-cylinder engine, as well as the intake and exhaust path connected to that cylinder. Continuing with FIG. 2, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel, planetary gearset, accessory drive belt, or other linkage (not shown). Combustion chamber, or cylinder, 30 is shown communicating with intake manifold 44 and exhaust manifold 48 via respective intake valves 52a and 52b (not shown), and exhaust valves 54a and 54b (not shown). While in this example two intake and two exhaust valves are used, alternative valve configurations may also be used, such as, for example, one intake and one exhaust valve, or two intake and one exhaust valves.

Fuel injector 66A is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a control valve positioned within the air passageway.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assistance (and/or an additional injection to assist in commencing auto-ignition by raising cylinder temperature). Further, in an alternative embodiment, the combustion chamber has no spark plug.

Controller 12 may be configured to cause combustion chamber 30 to operate in various combustion modes, as described herein. The fuel injection timing may be varied to provide different combustion modes, along with other parameters, such as EGR, valve timing, valve operation, valve deactivation, etc.

The example exhaust emission control device 70 represents one or more catalytic devices, such as three way catalyst, NOx traps, etc. that may be used.

Controller 12 is shown in FIG. 2 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of device 70 may be inferred from engine operation. In an alternate embodiment, temperature Tcat1 is provided by temperature sensor 124.

Continuing with FIG. 2, engine 10 is shown with an intake camshaft 130 and an exhaust camshaft 132, where camshaft 130 actuates both intake valves 52a,b and camshaft 132 actuates both exhaust valves 54a,b. The valves can be actuated via lift profiles on the camshafts, where the lift profiles between the different valves may vary in height, duration, and/or timing.

For example, actuators 136 and 138 may vary the timing and/or lift of cams 130 and 132, respectively. However, alternative camshaft (overhead and/or pushrod) arrangements could be used, if desired. In one example, actuators 136 and 138 are hydraulic vane type actuators in which hydraulic engine oil (pressured by an engine oil pump) is used to advance/retard the cam/valve timing. In some examples, a locking pin and spring mechanism are utilized to place the actuators in default locked positions if insufficient oil pressure/flow is present to control timing position (e.g., at low speed conditions when the oil is warmed up, during engine stopped conditions, etc.). The locked position may be either fully advanced, or fully retarded, for example.

In one example embodiment, where the full retard position is desired for warmed-up shutdowns and re-starts, the fully locked position may be selected as full retard. However, the full retard position may not be appropriate for all cold start, idle, or low RPM wide-open throttle conditions, where oil pressure may also be low. Thus, there may be conflicting requirements for the design of the mechanical locking pins for VCT actuators. As such, various methods of engine operation may be utilized as described in more detail below herein. Alternatively, electrically actuated valves may be used. However, such mechanisms are generally more suited to double overhead cam engines and may increase cost.

Still further, mechanisms for variable cam timing that do not require high oil pressure may be used, such as cam torque actuated VCT mechanisms. In yet another embodiment, a larger engine oil pump may be used to enable VCT operation at lower RPM, in which case the fully advanced or fully retarded position may be selected as the locked position. In still another embodiment, an electric engine oil pump may be used to provide oil pressure even when the engine provides insufficient oil pressure. I.e., an electric pump may be used in place of, or in addition to, an engine driven oil pump.

Continuing with FIG. 2, it merely shows one cylinder of a multi-cylinder engine, and it is understood that each cylinder has its own set of intake/exhaust valves, fuel injectors, spark plugs, etc. In an alternative embodiment, a port fuel injection configuration may be used where a fuel injector is coupled to intake manifold 44 in a port, rather than directly to cylinder 30.

Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling intake/exhaust valve timing.

The engine 10 may operate in various modes, including lean operation, rich operation, and "near stoichiometric" operation. "Near stoichiometric" operation refers to oscillatory operation around the stoichiometric air fuel ratio.

Referring now to FIG. 3, an alternative valve configuration is shown where a single overhead camshaft 134 is used to actuate both intake and exhaust valves via respective rocker arms 146 and 148. The camshaft 134 may be adjusted between an advanced and retarded position via variable valve timing actuator 144, which may be a hydraulic actuator, for example. This example may be referred to as dual equal variable cam timing, as any advance/retard affects both intake and exhaust valve timing substantially equally. In other words, this example shows a common camshaft which actuates at least one exhaust valve and one intake valve and may have adjustable valve timing. In particular, the cam timing may be adjustable in a range of approximately 60 degrees crank angle. Thus, when the cam timing is retarded, each of the intake valve opening timing, intake valve closing timing, exhaust valve opening timing, and exhaust valve closing timing are all retarded by an approximately equal amount of degrees. Likewise, when the cam timing is advanced, each of the intake valve opening timing, intake valve closing timing, exhaust valve opening timing, and exhaust valve closing timing are all advanced by an approximately equal amount of degrees.

Note that FIGS. 2-3 shows just some examples of systems that can advance/retard both an intake and an exhaust valve timing of a cylinder. For example, the range of adjustment may be greater or less than 60 degrees, or may use various mechanisms to achieve unequal advance/retard between valves.

Whatever the mechanism to provide retard of both intake and exhaust valve events under selected conditions (e.g., 30 to 60 degrees crank angle), such operation can provide improved fuel economy and reduced emissions at part load, and some benefits at wide-open throttle.

For example, as shown with regard to FIG. 3A, the graph shows example intake and exhaust valve timing, along with an example range of valve timing adjustment. In some prior examples, the locking pin engages in the fully advanced position, where the fully advanced position is used for cold starts, warm restarts, idle, and low RPM wide-open throttle. Up to 60 degrees of retard may be used for improved part load fuel economy and feedgas emissions. In one embodiment of the present application, improved warm engine restart behavior can be attained by engaging the locking pin in the fully retarded position. This can be combined with modified control strategy for cold starts and/or idle and/or low RPM wide-open throttle, as described below.

Referring now to FIGS. 4-7, routines are described for controlling engine and hybrid propulsion system operation. Specifically, the control routines may be used for oil pressure actuated dual retard engine systems in a hybrid propulsion system. The methods and actions described in the flowcharts recognize the interactions between the engine and hybrid system with a variable cam timing actuator having a locking position in a retarded position (e.g., locking pins would hold the cams in the full retard for one or both of intake and exhaust valve timing when oil pressure is too low). As noted above, such retarded timing may be advantageous for warmed-up shutdowns and re-starts.

However, full retard may not always be appropriate for warmed-up idle, low RPM wide-open throttle, or other low RPM conditions when the oil is warm (typically oil pressure may be too low for VCT operation below about 700-900 RPM). In one embodiment, the hybrid system can be used to adjust system operation to avoid operation in some of the above conditions. For example, most hybrid systems seek to minimize or reduce operation at warmed-up idle for improved fuel economy. However, even in such systems, some idle operation may be used when air conditioning is required, when the energy storage system is low (e.g. low battery state of charge), or for other reasons. Under these conditions, idle speed may be increased as a function of measured or inferred oil pressure. Thus, rather than disabling VCT operation, idle speed may be increased as a function of oil temperature (or inferred oil temperature), as described in more detail below.

Further, operation below 700-900 RPM at higher loads is less common. Even so, in a hybrid with CVT-like (Continuously Variable Transmission) functionality, the control system can directly change engine speed without changing vehicle speed, and thus may use logic similar to that above to maintain engine speed above a minimum VCT operation engine speed. In a hybrid system without CVT-like transmission functionality, minimum engine speed may be a constraint in the control logic for gear selection, torque converter lockup, and electronic throttle operation, etc., so that a minimum engine speed may be maintained when advanced timing is needed.

Figure 4:
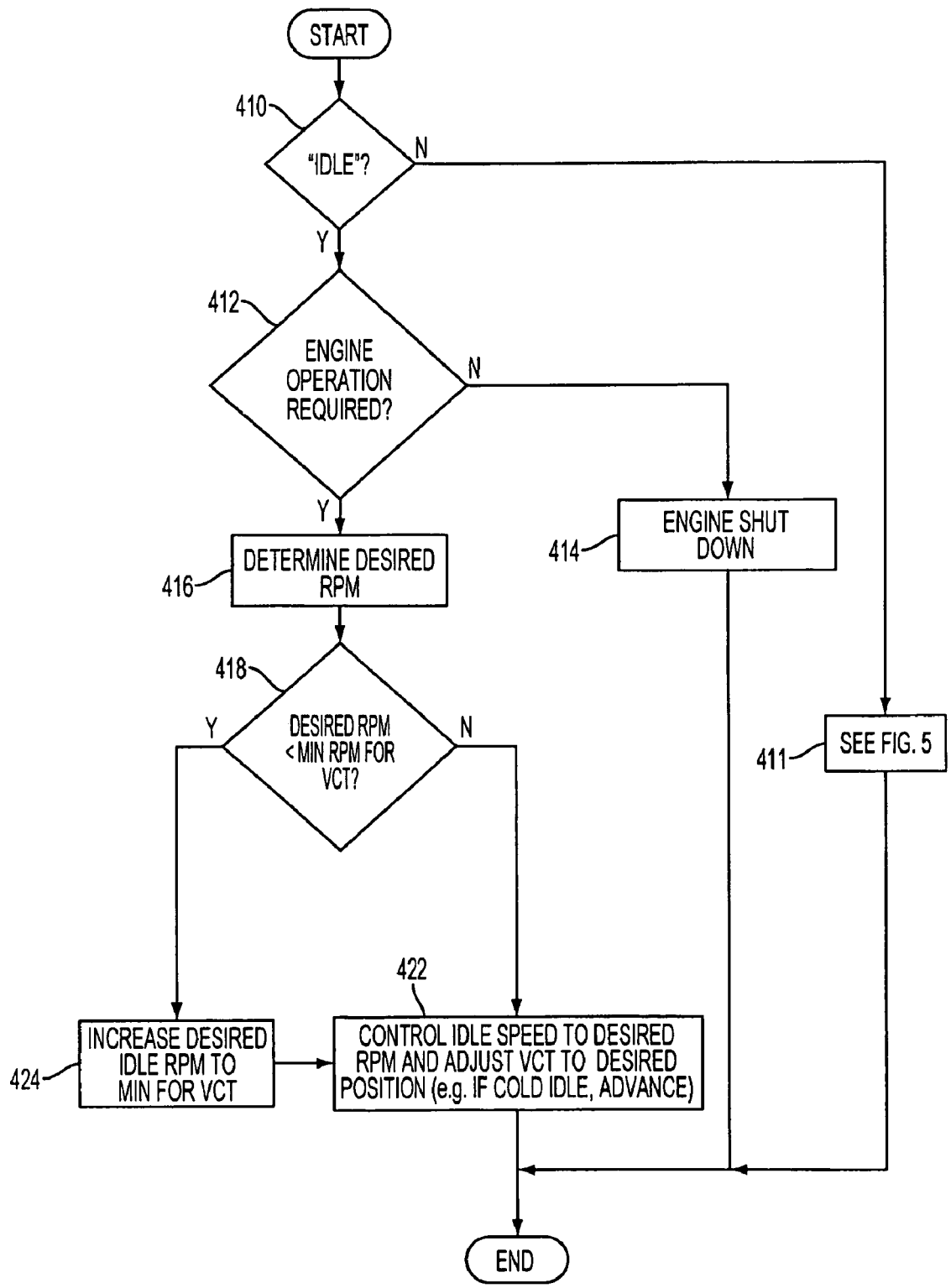

Referring now specifically to FIG. 4, a routine is described for adjusting engine operation to maintain variable cam timing operation is described. First, in 410, the routine determines whether idle conditions are present. Such a determination may be based on, for example, engine speed, engine power output, pedal position, vehicle speed, or combinations thereof. If idle conditions are not present, the routine continues to 411. If idle conditions are present, the routine continues to 412 to determine whether engine operation is required. For example, engine operation may be required due to low battery state of charge or a need to operate an air-conditioning system.

If the answer to 412 is no, the routine continues to 414 where the engine is shut down and the vehicle is operated via the motor/generator 18. Otherwise, when the answer to 412 is yes, the routine continues to 416 to determine a desired engine speed. For example, the routine may determine a desired engine idle speed based on engine coolant temperature, exhaust or catalyst temperature, ambient air temperature, accessory demand, amount of energy stored in device 20, or various combinations thereof. Next, the routine continues to step 418 to determine whether the desired engine idle speed is less than a minimum engine speed for variable cam timing operation. The minimum speed for variable cam timing operation may be based on hydraulic oil temperature, hydraulic oil pressure, engine temperature, or various combinations thereof. Alternatively, in 418, the routine may determine whether the hydraulic oil pressure for controlling variable cam timing is less than a minimum hydraulic pressure for acceptable valve control.

If the answer to 418 is no, the routine continues to 422 to control engine idle speed to the desired idle speed and adjust variable cam timing operation to the desired timing. For example, if the engine is operating under cold idle conditions, the routine advances intake and/or exhaust valve timing.

Alternatively, when the answer to 418 is yes, the routine continues to 424 to increase the desired engine idle speed to the minimum speed to maintain variable cam timing operation. Then from 424, the routine also continues 422.

In this way, operation may be adjusted to provide acceptable valve timing operation, and engine shut down operation.

Figure 5:
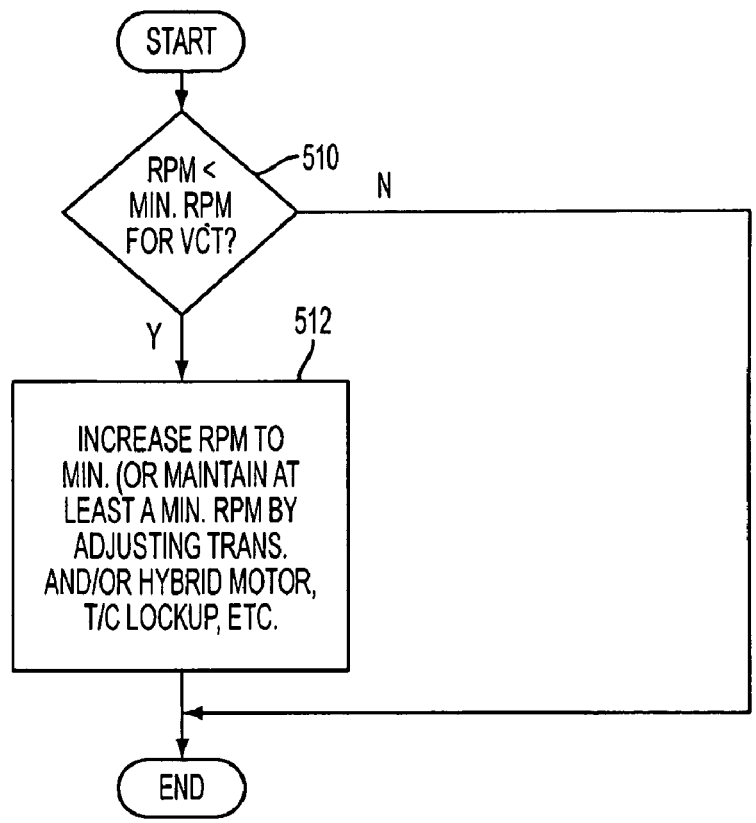
Figure 6:
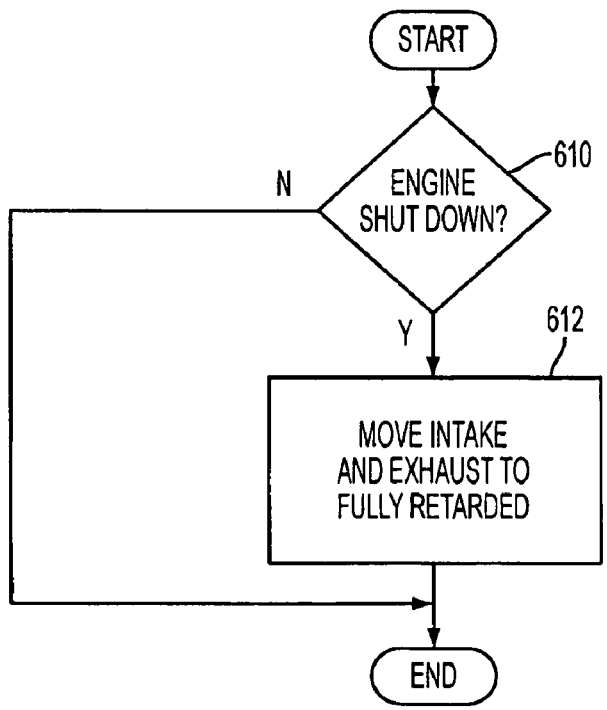

Referring now to FIG. 5, a routine is described for controlling engine speed to a minimum acceptable speed for maintaining variable cam timing operation outside of idle conditions. First, in 510, similar to 418, the routine determines whether the engine speed is below a minimum speed for maintaining variable cam timing operation. If so, the routine continues to 512 to increase engine speed at least to the minimum engine speed by adjusting transmission operation, motor operation, torque converter lockup, or combinations thereof. Referring now to FIG. 6, an engine shut down operation is described. Specifically, in 610, the routine determines whether an engine shut down is in progress. If so, the routine continues to 612 to move intake and exhaust valve opening/closing timings to a retarded, or fully retarded, position.

Figure 7:
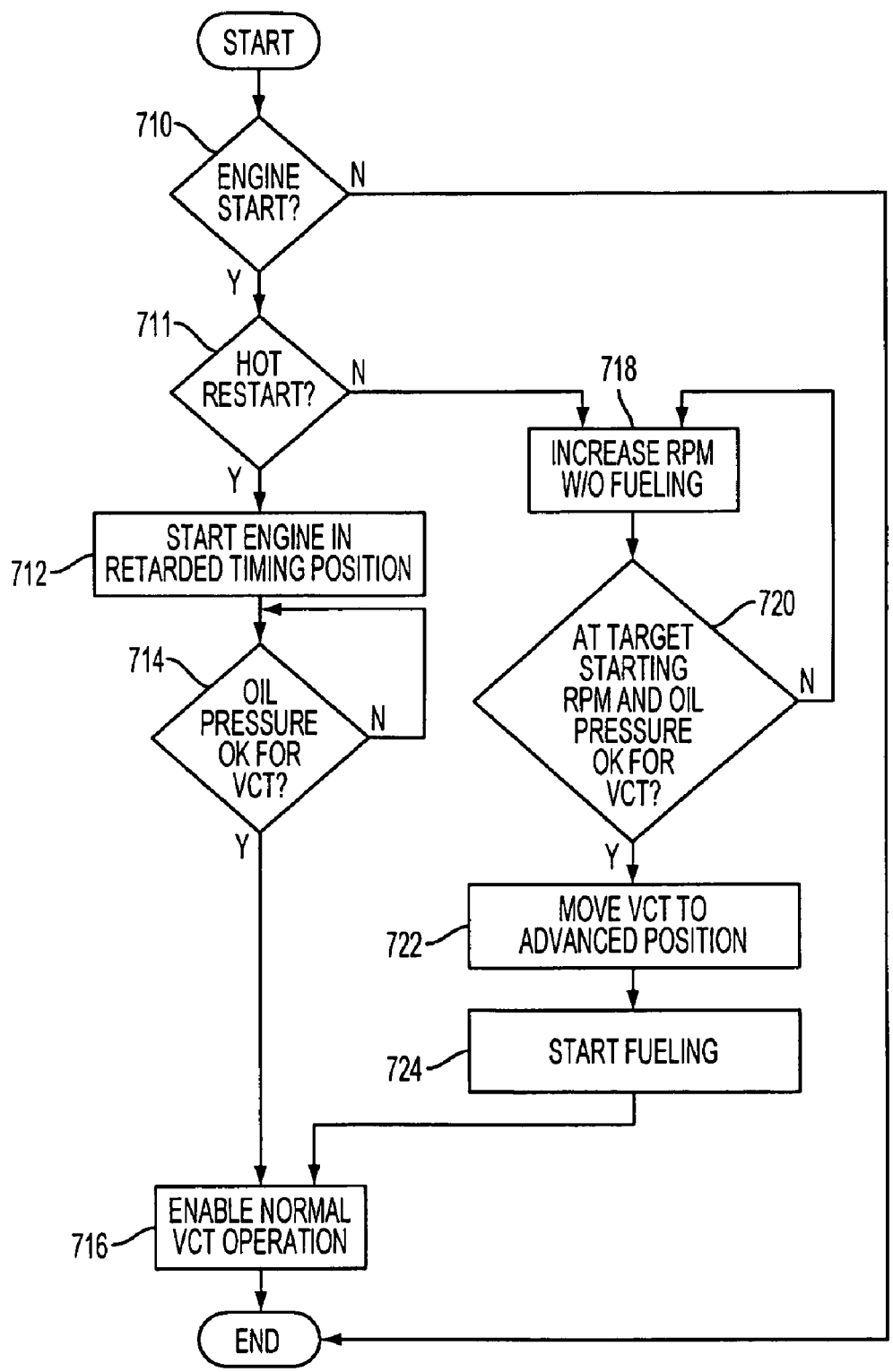

Referring now to FIG. 7, an example engine starting routine is described. First in 710, the routine determines whether an engine start condition is present. Various approaches may be determined to identify an engine start, such as an engine start command from a vehicle system controller, or an engine key on position, or various others. When the answer to 710 is yes, the routine continues to 711 where the routine determines whether it is a hot restart or a cold start. For example, a hot restart may be one that is requested by the vehicle system controller, while a cold start is one in response to a key on position. Alternatively, the two may be distinguished using exhaust or catalyst temperature, engine temperature, time since last start, etc. If a hot restart is desired, the routine continues to 712 and starts the engine with the intake and/or exhaust valve timing in a retarded, such as a full retard, position, in order to minimize oxygen flow to the catalyst. Next, in step 714, the routine determines whether sufficient oil pressure is present to control intake and/or exhaust valve timing away from the locked position (e.g. full retard). If the answer to 714 is yes, the routine continues to 716 to adjust the cam timing to a desired timing based on engine operating conditions, such as engine coolant temperature, number of combustion events from the engine start, time since engine start, ambient temperature, barometric pressure, engine speed, engine load, and various others.

Alternatively, if the answer to 711 is no, then a cold start is desired and the routine proceeds to 718. In this case, the catalyst may be saturated with oxygen, and it may be preferable to start the engine after the VCT is moved to a more advanced position. For example, a more advanced VCT position may improve combustion stability, improve fuel vaporization or air-fuel mixing, enable more spark retard and higher exhaust temperature, or reduce feedgas exhaust emissions. Therefore, in step 718 the routine increases engine speed without fueling or starting the engine. In step 720 the routine checks whether target starting speed has been reached, and whether oil pressure is high enough to enable VCT operation. If the answer to either question is no, the routine returns to 718 and continues to increase engine speed. If the answer to 720 is yes, the routine continues to 722 where the VCT is moved to a more advanced position. When the VCT reaches the desired position for engine cold start, the routine continues to 724 where fuel and/or spark are enabled and the engine starts running. The routine then continues to 716 where normal VCT operation is enabled.

In this way, it is possible to provide acceptable engine starting under a variety of operating conditions, and advantageously use an intake/exhaust variable valve adjustment system in which the valve timing is locked in a retarded valve timing position for hot restarts, but moved to a more advanced position for cold starts.

The various embodiments and examples disclosed hereinabove have addressed a variety of issues related to engine starting/stopping, hybrid propulsion systems, and hydraulic VCT actuator systems.

For example, by using retarded intake and exhaust valve timing during at least some engine shutdown operations and engine starting/cranking operations, it is possible to reduce the flow of fresh air and/or oxygen to the catalyst system, thus reducing a need for rich operation on restarts (thus improving fuel economy) and reducing NOx and/or hydrocarbon emissions. Such operation is especially useful in a hybrid system utilizing repeated engine stopping during vehicle operation, and thus may enable increased hybrid stop-start cycles, thus further improving fuel economy and reducing emissions. Furthermore, the retarded intake/exhaust timing during shutdown and/or cranking/starting can also reduce the amount of trapped charge thus reducing torque pulses on the crankshaft and improving NVH.

As another example, by appropriate selection of a variable valve timing actuator default position and system configuration, it is possible to address conflicting requirements for the default position for different starting conditions and different idle conditions, each of which rely on the default position to control valve timing when insufficient oil pressure is present. Further, by utilizing the above-noted intake and exhaust valve timing controls in a hybrid propulsion system, it is possible to take advantage of the ability to control engine speed at least somewhat independently from vehicle speed, thereby reducing or avoiding selected operating conditions which may necessitate a default valve timing position that degrades certain engine starting or idling operating conditions.

Referring now to FIGS. 8-12, addition control aspects related to engine starting and/or stopping are presented.

In these examples, engine valve timing is adjusted to reduce airflow in response to a request to stop the engine, and fuel flow is stopped to selected cylinders having valve timing adjustments when the adjusted timing reduces cylinder air charge of the cylinder below a predetermined amount. By adjusting valve timing after a request to stop an engine and by deactivating fuel when the air amount inducted into a cylinder is below a level that likely supports a desired combustion stability level, engine emissions and undesirable operator perceptions may be reduced. For example, valve timing and cylinder fueling can be adjusted in a controlled manner to reduce engine torque during an engine stop sequence, at least during some conditions. Further, stopping fuel flow when a cylinder inducted air amount reaches a predetermined level (e.g., an air amount that can result in a desired level of likely combustion stability) can reduce engine emissions since engine misfires may be reduced, thereby decreasing the amount of exhausted hydrocarbons. In addition, audible engine noise and engine torque may be more uniform since combustion may be more consistent. Reduced airflow may also reduce engine torque pulsations and NVH due to compression/expansion work during shutdown and/or restart.

In another embodiment, a method to start a variable event valvetrain internal combustion engine may be used, comprising: increasing the speed of the engine during a start from a stopped position after a request to start the engine; and increasing an intake valve timing amount of at least a cylinder during the start. By increasing valve timing as engine speed increases during an engine start, engine emissions and the amount of oxygen pumped to an exhaust system catalyst during engine starting may be reduced. For example, by operating the valve timing (e.g., of a dual retard engine) at a retarded position, the amount of air pumped through the engine may be reduced. As engine speed increases, and as engine position is determined, valve timing may be advanced so that combustion may be initiated in selected cylinders. In this way, retarded timing can reduce oxygen flow to a catalyst during a portion of a starting sequence and advanced timing can be used to increase cylinder charge so that torque can be generated during another portion of the starting sequence. Reduced airflow may also reduce engine torque pulsations and NVH due to compression/expansion work during shutdown and/or restart.

In addition, during a start, fuel flow can be stopped until an inducted air amount reaches a level that reduces the chance of misfires. This may further reduce engine starting emissions.

Referring now to FIG. 8, an example plot of signals that may be of interest during a simulated engine stop and/or start is shown. An engine start may include a cranking period (Ref. FIG. 9), an assisted nearly constant rate of engine speed increase from a stop (Ref. FIG. 8(*b*)), or a cylinder initiated direct start. A starting interval may be defined in a number of ways including: a period between the point where engine rotation begins and when engine speed reaches a predetermined speed (e.g., idle speed); a period between the point where engine rotation begins and when engine speed reaches a predetermined speed under power of the engine; a period between the point where engine rotation begins and when engine speed has passed through a predetermined speed a predetermined number of times; or a period between the point where engine rotation begins and when engine speed has reached a predetermined speed for a predetermined period of time.

Graph (a) represents an example engine stop request signal. This signal may be generated by an operator acting on a switch or automatically by a controller that monitors vehicle operating conditions and determines when to stop and/or start the engine, a hybrid powertrain controller for example. The high portion of the signal represents a command or request to stop the engine while the low signal portion represents a request to start the engine or to continue to operate the engine. The timing of the engine stop request relative to the other signals of FIG. 8 is illustrated by vertical lines $T_1$ and $T_4$.

Graph (b) illustrates an example engine speed trajectory during a request to stop and start an engine.

In some hybrid vehicle configurations, engine speed may be controlled using the secondary motor or independently from the secondary power plant (e.g., an electric or hydraulic motor). U.S. Pat. Nos. 6,176,808 and 6,364,807 describe a hybrid powertrain that may be capable of controlling engine speed via a secondary motor and independent engine and motor speed control. The patents are hereby fully incorporated by reference. This engine speed trajectory represents one of several trajectories that may be possible by controlling engine speed in a hybrid powertrain. In one example, an electric motor and a transmission can be used to control engine speed during stopping and starting. In addition, the valve or cam phase angle may be controlled with respect to the engine position and speed so that the inducted air amount may be regulated. In the figure, engine deceleration and acceleration are controlled during respective start and stop sequences. The engine speed and valve timing may be adjusted simultaneously to provide a desired cylinder air amount.

Graph (c) shows three example cylinder air flow amounts over a number of combustion events during engine starting and stopping. During engine stopping a fixed cam mechanical valvetrain can induct air similar to the way that is described by line 402. Since the valve timing is fixed, the cylinder air flow may be largely a function of engine speed. The cylinder air flow described by this line is the highest of the three examples. Cylinder air flow using a fixed cam mechanical valvetrain during a start may be described by line segment 409. FIG. 8 shows the engine stop request at a low level $T_4$, indicating start and operate the engine, and engine speed increasing after the engine stop request has been withdrawn. The cylinder and engine air flow increases as the engine speed increases. If the cylinder air flow increases while combustion is inhibited, oxygen pumped through the engine may cool and/or occupy catalyst sites that may be used to reduce NOx. Consequently, the efficiency of the catalyst may be reduced. On the other hand, if combustion is initiated at low cylinder air flows misfires may result. Therefore, it may be desirable during a start to limit cylinder air flow and inhibit combustion until a desired level of combustion stability may be attained.

Line 403 describes an example of cylinder air flow control using a variable event valve control mechanism that may be limited by certain phase control constraints. For example, a valve actuator may be limited to a certain valve phase amount at a constant lift amount. The valve actuator phase amount control signal (e.g., of a dual retard system) described by the fourth graph (d) shows an example trajectory for reducing cylinder air flow during an engine stop. After a request to stop the engine, the valve phase may be adjusted to reduce cylinder air flow as shown in the graph (d), with lower values representing higher retard. The effect of engine speed and valve phase on cylinder air flow can be seen in line 403 which shows two distinct segments that can describe air flow during an engine stop. The first segment after a request to stop the engine describes the effect of engine speed reduction and valve adjustments. The second distinct line segment occurs after the valve phase described by the graph (d) is complete (i.e., at some altered phase amount). This line segment shows that the valve actuator phase limitations may not completely stop engine air flow through the engine while the engine is rotating, but that cylinder air flow can be reduced compared to a fixed timing mechanical valvetrain.

During engine starting, a phase limited valve actuator may be controlled such that the actuator can be indexed from a partial or minimum flow position to another partial or full range flow position. By keeping the actuator at a minimum flow position the air flow through the engine may be reduced during a start. For example, line 415 shows one possible air flow reduction strategy during starting. Cylinder air flow may be reduced while the engine speed is below a target or desired amount, and then increased to a partial or full amount of the actuator range as the engine speed approaches a target speed, idle speed for example. This strategy can lead to cylinder air flow that may be represented by the two segment line 415.

Cylinder air flow for a valve actuator that may be capable of reducing cylinder air flow to near zero during an engine stop may be described by line 401. This line shows an engine air flow amount that can be a function of engine speed and valve phase. When the actuator reaches the minimum position illustrated in the graph (d), engine air flow is reduced to or near zero. Line 401 illustrates that it may possible to reduce the cylinder air amount to a level that is lower than the amount described by line 402 (fixed cam valvetrain) and line 403 (limited range valve actuator).

Engine starting may be further improved by allowing reduced or no air flow through an engine during starting. As described above, air flow through an engine during starting can reduce catalyst efficiency. Line 408 illustrates the result of one engine air flow amount control strategy that may be used to reduce the amount of oxygen that may be pumped to a catalyst during starting. Specifically, the air flow may be limited until a desired or target engine speed. Then, air flow may be increased until a desired engine or cylinder air flow amount is achieved.

Graph (d) illustrates one example of a valve phase trajectory that may be used to regulate engine and/or cylinder air flow. In this example, the valve phase command is reduced from an initial value (more advanced) at $T_1$ to a (retarded) value at $T_3$. Alternately, the phase reduction may begin at a time before or after the engine request stop time. That is, the engine stop may be delayed until a predetermined valve phase adjustment has been achieved, if desired. In addition, the valve phase amount does not have to be linearly ramped to a reduced/retarded position. Rather, the phase adjustment may be a step or stepped transition, an exponential decay transition, or a transition that may be a combination of the previously mentioned methods.

As mentioned above, increasing valve phase during an engine start may be delayed to reduce engine air flow. The engine start illustrated by FIG. 8 delays the valve phase adjustment for the period between $T_4$ and $T_5$ and completes the adjustment by $T_7$ where the desired engine speed is reached. In this example the delay time before valve phase adjustment ($T_5$-$T_4$) can be determined from the amount of time it can take to accelerate the engine from a stop to the desired start speed ($T_4$ to $T_7$), minus the time that it can take to move the valve phase actuator. Similar to the stop sequence, the valve phase amount does not have to be linearly ramped to a more advanced phase amount during a start. The lift may be a step or stepped transition, an exponential rise transition, or a transition that may be a combination of the before mentioned methods.

As described above, depending on the valve actuator design, it may also be possible to adjust valve timing to control engine and cylinder air flow. Valve phase may be adjusted in the manner illustrated by graph (d). However, valve timing may be advanced or retarded to reduce the amount of engine air flow depending on the base valve timing and the phaser range of authority.

Graph (e) shows an example of fuel delivery control during engine stopping and starting. Fuel flow is stopped at $T_2$, a location that may be coincident with an engine or cylinder air amount that designates a lower boundary of air necessary for a desired level of combustion stability. That is, fuel flow may be stopped when combustion stability is likely to be less than a desired level, thereby reducing misfires. In this example, fuel can be stopped at a cylinder air amount identified at location 405 for a valvetrain that may be capable of reducing cylinder air flow to near zero, at location 406 for a valvetrain capable of limited cylinder air flow reduction, and at location 407 for a valvetrain having fixed cam mechanically actuated valves.

Fuel control during a start is also shown in graph (e). Fuel may be enabled at $T_6$ where an increase in valve phase can allow a cylinder to induct an air amount that may produce a desired level of combustion stability. Delaying fuel until a level of combustion stability may be attainable may reduce engine emissions and driver disturbances since the number of cylinder misfires may be reduced. In this example, fuel may be delayed during a start for a cylinder air amount identified at location 419 for a valvetrain that may be capable of reducing cylinder air flow to near zero, at location 411 for a valvetrain capable of limited cylinder air flow reduction, and at location 413 for a valvetrain having a fixed cam mechanically actuated valves.

An alternative method to start a variable event valvetrain can be to increase engine speed from a stop to a predetermined speed (e.g., idle speed) while the valve phase is set to a reduced amount and while fuel flow is stopped. At or near the predetermined desired engine speed, fuel flow may be activated and valve phase may be increased or valve phase may be adjusted so that combustion may be initiated in one or more cylinders. In other words, at an engine stop, valve phase may initially be set to a fully retarded amount, and when the engine reaches a predetermined speed the valve phase may be advanced (partially or fully) and then fuel injection may proceed. Intake and/or exhaust valves may be controlled in this manner, but engine starting may be more difficult if flow through exhaust valves is reduced since more exhaust residuals may be included in the cylinder mixture. In this way, valve timing can reduce or stop oxygen flow to an exhaust catalyst so that catalyst efficiency may be increased. Reduced airflow may also reduce engine torque pulsations and NVH due to compression/expansion work during shutdown and/or restart.

Note that in the example of a hybrid powertrain, the system may have two or more potential torque output devices and is may include the combination of an internal combustion (IC) engine with a secondary power system. For example, a hybrid powertrain may comprise a combination of an IC engine and an electric motor, an IC engine and a hydraulic power system, an IC engine and a pneumatic power system, an IC engine and one or more energy storage flywheels, and various combinations of the before mentioned systems. In addition, during an engine stop it is not necessary that the valve phase be adjusted from a maximum to a minimum amount. In other words, the valve phase can be reduced during the stop sequence from a first amount to a second amount. Also, the effect that the phase amount adjustment has on engine air flow may depend on engine speed, valve geometry, and initial and/or final phase adjustment amounts. Likewise, during an engine start it is not necessary to increase the valve phase amount from a minimal amount to a maximum amount. The valve phase may be increased from a first amount to a second amount. Furthermore, the valve phase of intake and exhaust valves may also be adjusted separately during an engine stop sequence.

Referring to FIG. 9, an example sequence that illustrates an alternative simulation of an engine stop and start is shown. The signals and graphs are similar to those shown in FIG. 8. However, FIG. 9 illustrates a different engine starting method. In particular, engine starting with the assistance of a starter motor is shown.

Graph (a) shows an example engine stop request signal. As mentioned above, the request to stop may be generated in a number of ways including by a driver or by a hybrid powertrain controller. Graph (b) shows engine speed during a stop and a start. The engine stop sequence is the same as in FIG. 8, but in this example no engine speed control is provided by a large secondary motor (e.g., an electric or hydraulic motor).

Engine starting speed is shown on the right hand side of the graph (b). The figure shows engine speed increasing and leveling off to a cranking speed (i.e., the cranking period) by way of a starter motor. Cranking occurs approximately during the period between $T_4$ and $T_6$. After fuel is introduced at location $T_6$ the engine speed begins to increase from the resulting in-cylinder combustion. After run-up (i.e., the interval between engine cranking speed and engine idle speed where the engine is accelerating) the engine speed stabilizes at a predetermined level, idle speed for example. However, it is not necessary that the engine speed remain at idle speed, the engine speed may change after the run-up period in response to operator demand.

Graph (c) shows cylinder air flow over a number of combustion events during engine starting and stopping. Cylinder air flow lines 501, 502, and 503 show cylinder air flows for a valvetrain that can reduce flow to or near zero, a fixed cam mechanically driven valvetrain, and valvetrain actuator having a limited range of authority, respectively. Fuel flow is stopped at a cylinder air amount that is represented by the respective cylinder air flow curves at locations 505, 507, and 506.

Similar to the sequence illustrated by FIG. 8, engine air amount can be reduced during a stop sequence so that combusted gases continue to heat and provide exhaust gases to a catalyst. The combusted gases flow to the catalyst until a desired predetermined level of combustion stability may not be attained. Further, air flow may be reduced until a desired valve phase is reached.

When starting by a starter cranking method, the cylinder air amount for respective valvetrains may be illustrated by lines 508, 509, and 515. Cylinder air flow for a valvetrain having a fixed cam mechanically actuated valves corresponds to line 509, a valvetrain actuator having limited range of authority may be represented by line 515, and a valvetrain actuator capable of cylinder air flow to or near zero may be represented by line 508. Fuel flow is started at a cylinder air amount that is represented by the respective cylinder air flow curves at locations 513, 516, and 511.

Graph (d) illustrates an example valve actuator phase amount during engine stopping and starting. Cylinder air flow reduction by adjusting a valve actuator begins at $T_1$, coincident with the engine stop request, and ends at $T_3$.

On the right hand side of the graph (d), valve actuator adjustment is shown during a start. In this example, the valve adjustment is delayed for a time after the request to stop the engine has been withdrawn. The delay period duration may be zero or it may be a function of the time to recognize engine position, engine position at start, time to pressurize the fuel delivery system, engine temperature, or any other engine or vehicle operating condition, for example.

Graph (e) of FIG. 9 illustrates the timing of enabling fuel flow during engine stopping and starting. During this example engine stopping sequence, fuel is stopped at location $T_2$ which corresponds to a cylinder air charge at location 505 of the curve that represents one method of controlling a valve actuator that may be capable of zero or near zero cylinder air flow. Locations 506 and 507 represent air charge amounts that are equivalent to location 505 using different valve actuation methods, but the time that it takes to achieve these levels of cylinder air charge may be increased since cylinder air amount is being reduced at a lower rate. Consequently, in other examples, fuel flow deactivation may be delayed by the amount of time that it may take to reach the cylinder air amount that represents a desired level of combustion stability. This method can be used to decrease engine torque while providing a combusted mixture to the catalyst, and may reduce the amount of air that may be pumped to the catalyst during an engine stop. Reduced airflow may also reduce engine torque pulsations and NVH due to compression/expansion work during shutdown and/or restart.

Fuel flow enablement during a start is shown by the right hand side of graph (e). At location $T_6$ fuel is activated, this location corresponds to the cylinder air amount 516 that can provide a desired level of combustion stability. Cylinder air amounts at locations 513 and 511 are the same level of cylinder air amount at location 516, but the cylinder air charge levels are achieved before the time that the cylinder air charge is achieved at location 516. In other words, during cranking and run-up more air may flow through an engine having a fixed cam mechanically actuated valvetrain or through a limited range adjustable valvetrain than through a valve actuator that may be capable of zero or near zero cylinder air flow. Reducing the air flow through the engine during cranking and run-up may reduce engine emissions. For example, fuel may be delayed during a start so that the engine controller has time to determine engine position and deliver a fuel amount to a selected cylinder. However, by delaying fuel flow during a start, some cylinders may pump air though the engine thus cooling and/or oxygenating the catalyst, thereby potentially reducing catalyst efficiency during a subsequent restart.

Referring to FIG. 10, a flow chart of an example engine stopping sequence for a variable event valvetrain engine is shown. During an engine shutdown (i.e., an engine stop sequence) some engines are stopped by immediately stopping fuel flow and spark to the engine cylinders. After fuel flow is stopped the engine can continue to rotate as the engine speed decreases. As a consequence, air that has not participated in combustion may be pumped from the intake manifold to the exhaust system and through a catalyst. This may increase engine emissions when the engine is restarted since the air may cool the catalyst and/or the oxygen in air may occupy catalyst sites that otherwise could be used to reduce NOx.

In step 601, the routine determines if a request to stop the engine has been made. If a request has not been made to stop the engine the routine exits. The routine of FIG. 10 can be repeatedly executed at predetermined times or in response to an engine or controller operating event so that valve adjustments may be readily made. If a request has been made the routine continues to step 602.

In step 602, engine speed can be reduced, and cylinder air flow may also be reduced by adjusting a valve actuator mechanism. In one embodiment, valve phase amount may be adjusted to reduce the cylinder charge mass, thereby, reducing the available cylinder torque. For example, the intake and/or exhaust valve opening and/or closing positions relative to a crankshaft position may be adjusted to reduce the cylinder charge mass. The adjustments to valve phase may be made simultaneously or consecutively. Fuel adjustment may be made proportionally to the cylinder air amount adjustment or it may be a function of engine operating conditions, such as engine temperature and time since start, for example.

A number of different methods may be used to adjust the valve actuator (e.g., valve opening and/or closing phase) so that cylinder air charge and/or engine torque may be lowered during an engine stop. In one embodiment, the valve opening and closing positions may be retarded or advanced by 100 crankshaft angle degrees per second, for example, so that the inducted air charge may be lowered. In yet another embodiment, the valve lift may be adjusted in further response to engine operating conditions, barometric pressure and/or desired torque for example.

In one example, intake valve timing may be adjusted while exhaust valve timing can be fixed so that exhaust valve opening and closing positions are known. In this example and other examples, the method described in U.S. patent application Ser. No. 10/805,642 can be used to determine cylinder air amount after a request to stop an engine and the application is hereby fully incorporated by reference. Individual cylinder air amounts can be determined from cylinder pressure which can be related to engine torques by the following equation:

$$IMEP_{cyl}(\text{bar}) = \left( \frac{\Gamma_{brake} - \left( \begin{array}{c} \Gamma_{friction\_total} + \\ \Gamma_{pumping\_total} + \\ \Gamma_{accessories\_total} \end{array} \right)}{\text{Num\_cyl}_{Act}} \right) * \frac{4\pi}{V_D} * \frac{(1*10^{-5} \text{ bar})}{N/m^2} \cdot SPKTR$$

Where $IMEP_{cyl}$ is the cylinder indicated mean effective pressure, $\Gamma_{brake}$ is engine brake torque, $\gamma_{friction\_total}$ is the total engine friction torque, $\Gamma_{pumping\_total}$ is the total engine pumping torque, $\gamma_{accessories\_total}$ is the total engine accessories torque, $\text{Num\_cyl}_{Act}$ is the number of active cylinders, VD is the displacement volume of active cylinders, SPKTR is a torque ratio based on spark angle retarded from minimum best torque (MBT), i.e., the minimum amount of spark angle advance that produces the best torque amount. By reducing the engine brake torque, engine speed may be reduced during a stop.

The term SPKTR can be based on the equation:

$$SPKTR = \frac{\Gamma_{\Delta SPK}}{\Gamma_{MBT}}$$

Where $\Gamma_{\Delta SPK}$ is the torque at a spark angle retarded from minimum spark for best torque (MBT), $\Gamma_{MBT}$ is the torque at MBT. The value of SPKTR can range from 0 to 1 depending on the spark retard from MBT.

Individual cylinder fuel mass can be determined, in one example, for each cylinder by the following equation:

$$m_f = C_0 + C_1*N + C_2*AFR + C_3*AFR^2 + C_4*IMEP^2 + C_5*IMEP^2 + C_6*IMEP*N$$

Where $m_f$ is mass of fuel, $C_0$-$C_6$ are stored, predetermined, regressed polynomial coefficients, N is engine speed, AFR is the air-fuel ratio, and IMEP is indicated mean effective pressure. Additional or fewer polynomial terms may be used in the regression based on the desired curve fit and strategy complexity. For example, polynomial terms for engine temperature, air charge temperature, and altitude might also be included.

A desired air charge can be determined from the desired fuel charge. In one example, a predetermined air-fuel mixture (based on engine speed, temperature, and engine load), with or without exhaust gas sensor feedback, can be used to determine a desired air-fuel ratio. The determined fuel mass from above can be multiplied by the predetermined desired air-fuel ratio to determine a desired cylinder air amount. The desired mass of air can be determined from the equation:

$$m_a = m_f \cdot AFR$$

Where $m_a$ is the desired mass of air entering a cylinder, $m_f$ is the desired mass of fuel entering a cylinder, and AFR is the desired air-fuel ratio.

In one example, valve timing that can be used to induct the desired amount of air into a cylinder may be determined by the method described in U.S. Pat. No. 6,850,831 which is hereby fully incorporated by reference. Intake valve closing position can influence cylinder air amount, at least during some conditions, because inducted cylinder air amount can be related to the cylinder volume at IVC and the pressure in the intake manifold. Therefore, the cylinder volume that can hold the desired mass of air in the cylinder may be determined so that the IVC location may be established. In other words, the cylinder volume during the intake and/or compression stroke that can hold the desired air mass, at a given intake manifold pressure, may be resolved into a unique crankshaft angle, the angle describing IVC. The cylinder volume at IVC for a desired mass of air entering a cylinder may be described by the following equation:

$$V_{a,IVC} = \frac{m_a}{\rho_{a,IVC}}$$

Where $\rho_{a,IVC}$ is the density of air at IVC, $V_{a,IVC}$ is the volume of air in the cylinder at IVC. The density of air at IVC can be determined by adjusting the density of air to account for the change in temperature and pressure at IVC by the following equation:

$$\rho_{a,IVC} = \rho_{amb} \cdot \frac{T_{amb}}{T_{IVC}} \cdot \frac{P_{IVC}}{P_{amb}}$$

Where $\rho_{amb}$ is the density of air at ambient conditions, $T_{amb}$ is ambient temperature, $T_{IVC}$ is the temperature of air at IVC, $P_{IVC}$ is the pressure in the cylinder at IVC, and $P_{amb}$ is ambient pressure. In one example, where IVC occurs before bottom-dead-center (BDC), pressure in the cylinder at IVC can be determined by differentiating the ideal gas law forming the following equation:

$$\dot{P}_{IVC} = \frac{\dot{m}_{cyl} \cdot R \cdot T - P_{IVC} \cdot \dot{V}}{V}$$

Where $P_{IVC}$ is cylinder pressure, V is cylinder volume at a particular crankshaft angle, R is the universal gas constant, and $\dot{m}$ is flow rate into the cylinder estimated by:

$$\dot{m}_{cyl} = \frac{C_D \cdot A_{valve}(\Theta) \cdot P_{run}}{\sqrt{R \cdot T}} \cdot \left(\frac{P_{cyl}}{P_{run}}\right)^{\frac{1}{\gamma}} \cdot \sqrt{\frac{2 \cdot \gamma}{\gamma - 1} \cdot \left(\frac{P_{IVC}}{P_{run}}\right)^{\frac{\gamma-1}{\gamma}}}$$

Where $C_D$ is the valve coefficient of discharge, $A_{valve}(\theta)$ is effective valve area as a function of crankshaft angle $\theta$, $P_{run}$ is the manifold runner pressure which can be assumed as manifold pressure at lower engine speeds, and $\gamma$ is the ratio of specific heats. $C_D$ is calibratible and can be empirically determined.

The effective valve area, $A_{valve}(\theta)$, can vary depending on the valve lift amount. The valve lift profile can be combined with the valve dimensions to estimate the effective area, $A_{valve}(\theta)$, via the following equation:

$$A_{valve}(\Theta) = L(\Theta) \cdot 2^{\pi \cdot d}$$

Where $L(\theta)$ is the valve lift amount that may be determined empirically by considering cylinder charge motion, combustion stability, minimum valve opening and closing duration, and emissions.

The volume of intake mixture at IVC may be determined by the following equation:

$$V_{i,IVC} = \frac{V_{a,IVC} - (1 - F_e) \cdot V_{r,IVC}}{f_{air}}$$

Where $f_{air}$ is the proportion of air in the intake mixture, $V_{a,IVC}$ is the cylinder volume occupied by air at IVC as describe above, and $F_e$ is the fraction of burned gas in the exhaust manifold that can be determined by methods described in literature. For stoichiometric or rich conditions $F_e$ can be set equal to one. $F_{air}$ can be determined from:

$$f_{air} = \frac{1}{1 + \frac{1}{AFR} + F_i}$$

Where AFR is the air fuel ratio and $F_i$ is the fraction of burned gas in the intake manifold. $F_i$ can be estimated by methods described in literature. The volume occupied by the total mixture at IVC can be determined by the equation:

$$V_{IVC} = V_{i,IVC} - V_{cl} + V_{r,IVC}$$

Where $V_{cl}$ is the cylinder clearance volume, $V_{r,IVC}$ is the residual volume at IVC, and $V_{IVC}$ is the total cylinder volume at IVC. The volume occupied by residual gas at IVC can be described by:

$$V_{r,IVC} = \frac{T_{IVC}}{T_{exh}} \cdot \frac{P_{exh}}{P_{IVC}} \cdot (V_{r,EVC} + V_{cl})$$

Where $T_{IVC}$ is the temperature at IVC that may be approximated by a regression of the form $T_{IVC} = f(N, m_f, \theta_{OV})$. Where N is engine speed, $m_f$ is fuel flow rate, and $\theta_{OV}$ valve overlap. $T_{exh}$ is temperature in the exhaust manifold, $P_{exh}$ is pressure in the exhaust manifold, $V_{cl}$ is cylinder clearance volume, $P_{IVC}$ is pressure in the cylinder at IVC, and $V_{r,EVC}$ is the residual volume at EVC. In one example, where IVO is before EVC and where EVC and IVO are after TDC, $V_{r,EVC}$ can be described by:

$$V_{r,EVC} = \int \frac{A_e(\Theta)}{A_i(\Theta) + A_e(\Theta)} dV(\Theta)$$

Where the integral is evaluated from IVO to EVC, and where $A_i$ and $A_e$ are the effective areas of the intake and exhaust valves for $\theta \in (\theta_{IVO}, \theta_{EVC})$ that may be determined in the same manner as described above for $A_{valve}(\Theta)$. In this example, a predetermined valve lift can be used to describe an effective area of the intake valve opening. The intake valve area may be varied as a function of $\Theta$ so that for a certain cylinder temperature and pressure, a desired mass fraction of EGR may be trapped in a cylinder displacing a volume $V_{r,EVC}$.

The cylinder volume minus the clearance volume at IVC can then be used to determine intake valve closing position by solving the following equation for $\theta$:

$$V_\Theta = \frac{\pi B^2}{4}\left[r + C - \left(C \cdot \cos\Theta + \sqrt{r^2 - C^2 \cdot \sin^2\Theta}\right)\right]$$

In this way, valve lift, IVC, and IVO can be determined by accounting for EGR and desired air amount.

In addition, engine fuel can also be adjusted in step 602 so that a desired exhaust air-fuel mixture may be achieved. During some conditions the exhaust gas air-fuel mixture may be lean while during other conditions the mixture may be rich or stoichiometric. For example, if an engine is stopped after being warm and if there may be a higher probability that the engine will restart, as with some hybrid vehicle applications, the air-fuel mixture can be commanded to stoichiometry so that the probability of disturbing an exhaust system catalyst may be reduced. The routine proceeds to step 603.

In step 603, a decision is made to continue reducing cylinder air amount or to proceed to a step that can stop fuel flow to the engine. If the valve timing determined from step 602 inducts a cylinder air amount that may not be sufficient for a desired level of combustion stability the routine proceeds to step 604. If the cylinder air amount may be above an amount that supports a desired level of combustion stability, the routine returns to step 602.

In step 604, fuel flow to the engine or cylinder can be stopped. Because cylinder air amount may be adjusted to a level that may be below a desired combustion stability limit, it can be desirable to stop fuel flow to the engine or to individual cylinders. Fuel flow may be stopped when at least one cylinder air amount may be below a desired amount or fuel may be stopped in individual cylinders as the respective cylinder air amount may be reduced below a desired amount. If fuel flow is stopped on an individual cylinder basis, the valve phase may continue to be adjusted in cylinders that may not be below a desired cylinder air amount.

Spark may also be deactivated in step 604, preferably after the latest air-fuel mixture is combusted. Spark may be deactivated immediately after combusting the latest injected fuel or it may be deactivated after a predetermined number of cylinder cycles. By delaying spark deactivation, it may be possible to combust fuel that may be drawn into the cylinder from an intake manifold puddle, for example. The routine continues to step 605.

In step 605, valve phase can be evaluated to determine if further adjustments may be desired. If the valve phase is not at a desired low flow position the routine returns to step 604 where further valve actuator adjustment may be commanded. If the valve phase is at a desired low flow position, the routine can proceed to step 606.

In step 606, valve phase can be held in a retard phase position. Typically, variable event valve actuators can be designed with a minimum phase position. In this position, the valve phase may be advanced or retarded relative to TDC, for example. Consequently, in this step, valve operating commands can be structured based on the actuator design so that a reduced flow, including zero flow, may pass through the cylinder as the engine decelerates to zero speed.

By commanding the valves to a phase that reduces cylinder flow, oxygen pumped through the engine to a catalyst may be reduced. As mentioned above, reducing oxygen flow to a catalyst can improve engine emissions during a subsequent start since the catalyst state may maintain a desirable level of oxidants. By regulating the amount of oxygen that may be stored in a catalyst, catalytic reaction sites may be available for both oxidation and reduction reactions, thereby increasing the possibility of converting HC, CO, and NOx during a subsequent restart. On the other hand, if the amount of oxygen stored on the catalyst is greater than desired, the catalyst NOx reduction capacity may be diminished since some reduction sites may be occupied by oxygen. Reduced airflow may also reduce engine torque pulsations due to compression/expansion work during shutdown and/or restart. The routine proceeds to step 607.

In step 607, engine speed is compared to a predetermined level. If engine speed is below a predetermined level, vlv_lim, the routine exits. When the routine exits, the valve actuators may be set to a desired position so that air flow and the cooling and the oxygen that it can bring to a catalyst may be reduced. If engine speed is above the predetermined level, the routine returns to step 606.

Referring to FIG. 11, an example flow chart of an engine starting sequence for an engine having a variable event valvetrain is shown.

After an engine is stopped, oxygen flow to a catalyst can alter the catalyst chemical or physical state so that engine emissions may increase during a subsequent restart. That is, it can be possible to stop an engine when catalyst chemistry may be favorable to converting hydrocarbons, carbon monoxide, and oxides of nitrogen. However, allowing the amount of oxygen stored in the catalyst to increase during an engine stop period or during the starting can reduce the catalyst NOx conversion efficiency since oxygen flow to a catalyst can reduce catalyst temperature and since stored oxygen may be preferentially used to oxidize hydrocarbons and carbon monoxide. Consequently, NOx may pass through the catalyst without being reduced because potential reduction sites may be occupied by oxygen that may have been pumped through the engine. The method of FIG. 11 may reduce engine emissions by reducing the amount of oxygen pumped through an engine during a start. Reduced airflow may also reduce engine torque pulsations and NVH due to compression/expansion work during shutdown and/or restart.

Continuing with FIG. 11, in step 701, the routine determines if a request to start the engine has been made. If there has been no request to start the engine the routine can exit. The routine of FIG. 11 can also be repeatedly executed at predetermined times or in response to an engine or controller operating event so that valve adjustments may be readily made. If there is a request to start the engine the routine proceeds to step 703.

During this step the valves may also be commanded to an initial position, a predetermined valve phase (e.g., a retarded phase) where flow through the cylinder may be reduced when the engine rotates, if desired. However, valves may be held in a low flow position (e.g., closing all valves, closing intake valves, or closing exhaust valves) while the engine is stopped to further reduce oxygen flow to a catalyst.

In step 703, the routine increases engine speed and determines when to begin adjusting valve phase. In one example, the electric motor of a hybrid vehicle uses at least a portion of the electric motor power to rotate an internal combustion engine. The engine speed can be ramped up to a desired speed in a linear manner, if desired.

The valve adjustment timing schedule can be resolved by subtracting the time for the valve actuator to move from an initial position to a desired position, vev_$\Delta T$, from the time to accelerate the engine from stop to a desired speed, $\Delta T$. That is, the valve adjustment starting time can be expressed by the following equation:

$$T\_strt\_vlv = \Delta T - vev\_\Delta T$$

FIG. 8 can be used to illustrate this method of valve actuator control. The starting sequence begins at the time represented by vertical line $T_4$ and the engine reaches a desired speed at time $T_7$. This is the time $\Delta T$. The time to move the valve actuator to a desired position is the time between $T_5$ and $T_7$, vev_$\Delta T$, and may be a function of engine oil temperature and/or battery voltage, for example. The engine rotates from $T_4$ to $T_5$ before the valve actuator begins to move to the desired position. In this way, the air flow through the engine during an engine start may be reduced since the valves may be commanded to a low flow position while the engine speed is increasing and cylinders may be pumping air through the engine. The routine continues to step 705.

It is also possible to adjust intake and exhaust valve phase separately during a start so that air pumped through an engine may be reduced. For example, exhaust valve phase may be initially set to a retarded, or fully retarded position, and then increased as engine speed increases. By adjusting phase at lower engine speed, less air may be pumped into the exhaust manifold for at least a portion of the starting interval. As engine speed increases, and as engine position is determined, exhaust valve phase may be advanced so that combusted gases may be expelled into the exhaust system. This method may be more beneficial after a longer engine off period than after a shorter engine off period since fewer exhaust residuals may be trapped within the cylinder.

In step 705, engine speed continues to increase and the variable event valvetrain may be held at a constant actuator position. That is, the valve may be held at a minimum or flow reducing position. This method can allow the engine to reach a desired speed with reduced cylinder flow. The routine proceeds to step 707.

In step 707, a decision can be made to begin adjusting the variable event valve actuator. If the valve starting time has been exceeded the routine proceeds to step 709. If not, the routine returns to step 705.

In step 709, the variable event valvetrain may be adjusted while engine speed is being increased. Cylinder air flow may be increased by adjusting the valve phase. The adjustment may be at a constant or variable rate depending on objectives. Furthermore, the adjustment rate may be based on time (e.g., milli-meters per second) or engine speed. Alternatively, the valve phase may be adjusted to produce a desired cylinder or engine torque or to induct a desired cylinder air charge. The routine proceeds to step 715.

In step 715, a decision can be made to continue valvetrain adjustment or to proceed to step 717 based on engine speed. If the engine speed is below a predetermined desired amount the routine returns to step 709. If the engine speed is above a predetermined amount the routine continues to step 717.

In step 717, a decision can be made to continue valvetrain adjustment or to proceed to step 713. If the variable event valvetrain is at a desired position the routine proceeds to step 713. If not, the routine returns to step 709.

Note: steps 715 and 717 may be combined into a single step that allows the routine to proceed to step 717 if both the engine speed is at a desired level and if the variable event valvetrain is at a desired phase. If not, the routine would return to step 709.

In step 713, cylinder fuel can be enabled and the variable event valvetrain can be held in position. By delaying fuel until a desired amount of cylinder air flow may be present, misfires may be reduced. Further, delaying valve adjustment until the engine is at a desired speed can reduce the air pumped to a catalyst and may improve engine emissions during the restart.

Cylinder spark can also be reactivated in step 713 so that the injected fuel can be combusted. The routine proceeds to exit.

In an alternate example, a valve adjustment timing schedule illustrated by FIG. 9 may be used. In this example, the engine can be rotated by a starter motor that may be capable of rotating the engine at lower speeds, 300 RPM or less for example.

The starting sequence begins at $T_4$ and the engine is at a desired speed at $T_7$. The time to adjust the valve actuator is shown between time $T_5$ and time $T_7$. In this example, the valve actuator does not begin to adjust the valve phase until location $T_5$. The delay time between $T_4$ and $T_5$ may be related to the time that it can take to synchronize the engine controller to the engine position and/or the delay time may be a function of engine oil temperature and/or battery voltage, engine friction, engine speed, and/or another engine related variable. As mentioned above, air flow through the engine during an engine start may be reduced since the valve may be commanded to a reduced flow position.

In yet another embodiment, the valve adjustment may begin coincident or delayed from initial engine rotation by a predetermined amount of time. When the valve actuator reaches a position that can support a desired level of combustion stability and/or a cylinder inducts a desired air amount, the fuel may be enabled.

The method of FIG. 11 may also be extended to include throttle control. In particular, an electronic throttle may be held closed or at a fixed position at a start until engine position is determined and/or until a predetermined valve phase amount may be achieved.

Note that the control routines included herein can be used with various engine configurations, such as those described above. The specific routine described herein may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-4, V-6, I-3, I-4, I-6, V-8, V-10, V-12, opposed 4, and other engine types. Specifically, dual Retard VCT may be applicable to all engines including SOHC or pushrod engines. Various valve timing ranges may used, such as up to IVC of approximately 120 deg after BDC. As another example, various other mechanisms may be used to control intake and/or exhaust valve timing. Further still, various hybrid propulsion systems may be used, such as hybrid electric, hybrid hydraulic, or combinations thereof. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, the vehicle including: an internal combustion engine coupled in the vehicle, the engine having at least one cylinder with an intake valve and an exhaust valve, where opening and closing timing of the intake valve is adjustably retardable and opening and closing timing of the exhaust valve is adjustably retardable via camshaft adjustments, during engine operation, an energy conversion device coupled in the vehicle capable of selectively supplying and absorbing torque during vehicle operation, and a transmission, the method comprising:

adjustably retarding intake valve opening timing and intake valve closing timing from piston top dead center; and adjusting operation of the transmission and the energy conversion device to maintain engine speed sufficient to enable adjustment of said intake and exhaust valve timing.

2. The method of claim 1 wherein said energy conversion device is coupled to an energy storage device.

3. A system for a vehicle, comprising:

an internal combustion engine coupled in the vehicle, the engine having at least one cylinder with an intake valve and an exhaust valve, the engine further having a camshaft configured to actuate both the intake valve and the exhaust valve, where opening and closing timing of the intake valve and exhaust valve are each adjustably retardable by equal amounts;

an energy conversion device coupled in the vehicle capable of selectively supplying and absorbing torque during vehicle operation; and a controller configured to adjust operation of the energy conversion device to maintain engine speed sufficient to enable adjustment of said intake and exhaust valve timing.

4. The system of claim 3 further comprising a transmission coupled in the vehicle, the controller configured to adjust operation of the transmission and the energy conversion device to maintain engine speed sufficient to enable adjustment of said intake and exhaust valve timing.

5. The system of claim 4 wherein said energy conversion device is coupled to an energy storage device.

6. The system of claim 3 wherein the camshaft is locked in a fully retarded position when oil pressure falls below a given pressure.

7. A method for operating a vehicle, the vehicle including an internal combustion engine coupled in the vehicle, the engine having at least one cylinder with an intake valve and an exhaust valve, where opening and closing timing of the intake valve is adjustably retardable and opening and closing timing of the exhaust valve is adjustably retardable via camshaft adjustments by equal amounts, during engine operation, the vehicle further including an energy conversion device coupled in a hybrid propulsion system that selectively supplies and absorbs torque during vehicle operation, the method comprising:

adjusting the opening and closing timing of the intake valve and the exhaust valve during at least one of a start and stop of the engine; and adjusting operation of the energy conversion device to maintain engine speed sufficient to enable the adjustment of the intake and exhaust valve timings.

8. The method of claim 7 wherein the engine is operated with retarded intake opening and closing timing and retarded exhaust valve opening and closing timing during at least one engine shut-down.

9. The method of claim 8 further comprising operating the engine with retarded intake opening and closing timing and retarded exhaust valve opening and closing timing during at least one engine start.

10. The method of claim 9, wherein said start follows said at least one engine shut-down, and both said shut-down and start occur during vehicle operation where the vehicle is powered by a motor in the hybrid propulsion system.

* * * * *